United States Patent
Gerard et al.

(10) Patent No.: US 12,331,200 B2
(45) Date of Patent: Jun. 17, 2025

(54) PRODUCTION OF SURFACE-REACTED CALCIUM SALTS BY GRINDING INDUCED CONVERSION

(71) Applicant: OMYA INTERNATIONAL AG, Oftringen (CH)

(72) Inventors: Daniel E. Gerard, Basel (CH); Lassi Karvonen, Basel (CH)

(73) Assignee: Omya International AG, Oftringen (CH)

(*) Notice: Subject to any disclaimer, the term of this patent is extended or adjusted under 35 U.S.C. 154(b) by 759 days.

(21) Appl. No.: 17/420,308

(22) PCT Filed: Jan. 31, 2020

(86) PCT No.: PCT/EP2020/052408
§ 371 (c)(1),
(2) Date: Jul. 1, 2021

(87) PCT Pub. No.: WO2020/157268
PCT Pub. Date: Aug. 6, 2020

(65) Prior Publication Data
US 2022/0089879 A1    Mar. 24, 2022

(30) Foreign Application Priority Data
Feb. 1, 2019 (EP) .................................. 19155098

(51) Int. Cl.
C09C 1/02 (2006.01)
C01B 25/32 (2006.01)
C09C 3/04 (2006.01)

(52) U.S. Cl.
CPC ............ C09C 1/022 (2013.01); C01B 25/327 (2013.01); C09C 3/041 (2013.01); *C01P 2004/51* (2013.01); *C01P 2006/12* (2013.01)

(58) Field of Classification Search
None
See application file for complete search history.

(56) References Cited

U.S. PATENT DOCUMENTS

| 3,236,593 A | 2/1966 | Hartmann et al. |
| 6,033,780 A | 3/2000 | Nishioka et al. |

FOREIGN PATENT DOCUMENTS

| EP | 1092679 A1 | 4/2001 | |
| EP | 3275947 A1 | 1/2018 | |
| FR | 2158055 | 6/1973 | |
| WO | WO-2018019699 A1 * | 2/2018 | ............ A01N 59/00 |

OTHER PUBLICATIONS

International Search Report and Written Opinion in International Application No. PCT/EP2020/052408 mailed Mar. 17, 2020.
Kosachan et al., "Hydroxyapatite nanoparticles formed under a wet mechanochemical method", Society for Biomaterials, Wiley Periodicals, Inc., pp. 679-688. 2015.

* cited by examiner

*Primary Examiner* — Yun Qian
(74) *Attorney, Agent, or Firm* — Heslin Rothenberg Farley & Mesiti P.C.

(57) ABSTRACT

The present invention relates to a process for producing an aqueous suspension of surface-reacted calcium salt particles by mixing a calcium salt excluding monocalcium phosphate and dicalcium phosphate, a calcium phosphate selected from monocalcium phosphate and/or dicalcium phosphate, with water, and grinding the obtained aqueous suspension at a pH value of at least 4.2 to form an aqueous suspension of surface-reacted calcium salt particles.

12 Claims, No Drawings

PRODUCTION OF SURFACE-REACTED CALCIUM SALTS BY GRINDING INDUCED CONVERSION

CROSS REFERENCE TO RELATED APPLICATIONS

This application is a U.S. National Phase filing under 35 U.S.C. § 371 of International Application PCT/EP2020/052408, filed Jan. 31, 2020, and published as WO 2020/157268 A1 on Aug. 6, 2020. PCT/EP2020/052408 claims priority from European patent application number 19155098.7, filed Feb. 1, 2019. The entire contents of each of these prior applications are hereby incorporated herein by reference.

The present invention relates to surface-reacted calcium salt particles, a process for manufacturing the same, and their use.

In the year of 1998, a new type of surface-reacted calcium carbonate was first described in FR 2787802 B1, subsequently in WO 00/39222 A1 and US 2004/0020410 A1, and is based on the reaction of natural ground calcium carbonate with gaseous $CO_2$ and with one or more medium-strong to strong $H_3O^+$ ion providers. The obtained product is a porous calcium carbonate having a special surface structure, porosity, and specific surface area providing a reduction in the weight of paper for a constant surface area without loss of physical properties, when it is used as a pigment or coating filler for the said paper.

In WO 2004/083316 A1, a further advantageous modification in the preparation of this surface-reacted calcium carbonate is described, wherein aluminium silicate, synthetic silica, calcium silicate, silicates and/or monovalent salt are involved, and which are also useful in papermaking applications.

Also, WO 2005/121257 A2 refers to the addition of advantageous additives in the production of said surface-reacted calcium carbonate, wherein one or more compounds of formula R-X are added, which, e.g. are selected from fatty acids, fatty amines or fatty alcohols.

WO 2009/074492 A1 especially relates to the optimization of the known process as regards precipitated calcium carbonate, as it turned out that due to the special conditions in the precipitation of calcium carbonate, the process useful for natural ground calcium carbonate did not provide the same good results for the surface-reaction of synthetic precipitated calcium carbonate.

Several further optimizations and modifications of the process for the preparation of surface-reacted calcium carbonate followed such as those described in WO 2010/146530 A1 and WO 2010/146531 A1 involving the use of weak acids in the preparation of surface-reacted calcium carbonate.

EP 2 957 603 A1 describes a method for producing granules comprising surface-reacted calcium carbonate.

However, there is still a need in the art for methods for producing surface-reacted calcium salts, and in particular, economic methods yielding surface-reacted calcium salt particles with small particle sizes and high specific surface areas.

Accordingly, it is an object of the present invention to provide an economic process for producing surface-reacted calcium salt particles with small particle sizes and high specific surface areas. It would be desirable to provide a process which can utilize starting materials having a lower quality such as by-products of other processes or waste-materials. It would also be desirable to provide a process which can utilize coarse starting materials.

It is also an object of the present invention to provide a process for producing surface-reacted calcium salt particles, which can be carried out as continuous process and can be operated at low starting temperatures. It is desirable to provide a process, which can be carried out with standard equipment. It is also desirable that the process does not require the addition of $CO_2$.

It is also an object of the present invention to provide a material, which is at least partially derivable from natural sources and is not persistent in the environment, but easily biodegradable. It is desirable that the obtained surface-reacted calcium salt particles can be used as filler material so that they may replace conventionally used fillers in various applications or supplement them. It is also desirable that the functionality of the surface-reacted calcium salt particles can be controlled and can be tailored for a specific application.

The foregoing and other objects are solved by the subject-matter as defined in the independent claims.

According to one aspect, a process for producing an aqueous suspension of surface-reacted calcium salt particles is provided, comprising the steps of:
  a) providing a calcium salt excluding monocalcium phosphate and dicalcium phosphate,
  b) providing a calcium phosphate selected from monocalcium phosphate and/or dicalcium phosphate,
  c) forming an aqueous suspension by mixing the calcium salt of step a), and the calcium phosphate of step b) with water, and
  d) grinding the aqueous suspension of step c) at a pH value of at least 4.2 to form an aqueous suspension of surface-reacted calcium salt particles,
  wherein the calcium salt of step a) and the calcium phosphate of step b) in combination have a calcium ion to phosphate ion molar ratio ($Ca^{2+}:PO_4^{3-}$) in the range from 1.75:1 to 100:1.

According to another aspect of the present invention, surface-reacted calcium salt particles obtainable by a process according to the present invention are provided.

According to still another aspect of the present invention, use of surface-reacted calcium salt particles according to the present invention in polymer applications, paper coating applications, paper making, paints, coatings, sealants, printing inks, adhesives, food, feed, pharmaceuticals, concrete, cement, cosmetics, water treatment, engineered wood applications, plasterboard applications, packaging applications, or agricultural applications is provided.

According to still another aspect, an article comprising surface-reacted calcium salt particles according to present invention is provided, wherein the article is selected from paper products, engineered wood products, plasterboard products, polymer products, hygiene products, medical products, healthcare products, filter products, woven materials, nonwoven materials, geotextile products, agriculture products, horticulture products, clothing, footwear products, baggage products, household products, industrial products, packaging products, building products, or construction products.

Advantageous embodiments of the present invention are defined in the corresponding subclaims.

According to one embodiment the calcium salt of step a) is selected from a calcium carbonate-comprising material, calcium oxide, calcium hydroxide, calcium chloride, calcium nitrate, calcium chlorate, calcium bromide, calcium iodide, calcium acetate, calcium sulphate, calcium citrate, or mixtures thereof, preferably the calcium salt of step a) is selected from a calcium carbonate-comprising material, calcium chlorate, calcium bromide, calcium iodide, calcium acetate, calcium sulphate, or mixtures thereof, more preferably the calcium salt of step a) is selected from a calcium carbonate-comprising material, calcium acetate, calcium sulphate, or mixtures thereof, and most preferably the calcium salt of step a) is a calcium carbonate-comprising material. According to another embodiment the calcium carbonate-comprising material is selected from natural ground calcium carbonate, precipitated calcium carbonate, dolomite, or mixtures thereof, preferably the calcium carbonate-comprising material is selected from natural ground calcium carbonate, precipitated calcium carbonate, or mixtures thereof, and more preferably the calcium carbonate-comprising material is ground calcium carbonate.

According to one embodiment the calcium salt of step a) is in form of particles having a weight median particle size $d_{50}(wt)$ from 0.05 to 500 µm, preferably from 0.2 to 200 µm, more preferably from 0.4 to 100 µm, and most preferably from 0.6 to 20 µm, and/or a weight top cut particle size $d_{98}(wt)$ from 0.15 to 1500 µm, preferably from 1 to 600 µm, more preferably from 1.5 to 300 µm, and most preferably from 2 to 80 µm. According to a further embodiment the calcium salt of step a) and the calcium phosphate of step b) in combination have a calcium ion to phosphate ion molar ratio ($Ca^{2+}:PO_4^{3-}$) in the range from 1.9:1 to 75:1, preferably from 2:1 to 50:1, more preferably from 2.2:1 to 25:1, and most preferably from 2.5:1 to 10:1.

According to one embodiment the calcium phosphate of step b) is dicalcium phosphate dihydrate and is provided in an amount from 1.7 to 230 wt.-%, based on the total weight of the calcium salt excluding monocalcium phosphate and dicalcium phosphate, preferably from 2.3 to 191 wt.-%, more preferably from 3.5 to 172 wt.-%, and most preferably from 19 to 115 wt.-%. According to a further embodiment the calcium phosphate of step b) is anhydrous dicalcium phosphate and is provided in an amount from 1.4 to 181 wt.-%, based on the total weight of the calcium salt excluding monocalcium phosphate and dicalcium phosphate, preferably from 1.8 to 151 wt.-%, more preferably from 2.8 to 136 wt.-%, and most preferably from 15 to 91 wt.-%.

According to one embodiment the calcium phosphate of step b) is anhydrous monocalcium phosphate and is provided in an amount from 1.2 to 94 wt.-%, based on the total weight of the calcium salt excluding monocalcium phosphate and dicalcium phosphate, preferably from 1.6 to 84 wt.-%, more preferably from 2.4 to 78 wt.-%, and most preferably from 12 to 59 wt.-%. According to a further embodiment the calcium phosphate of step b) is monocalcium phosphate monohydrate and is provided in an amount from 1.3 to 100.1 wt.-%, based on the total weight of the calcium salt excluding monocalcium phosphate and dicalcium phosphate, preferably from 1.7 to 90 wt.-%, more preferably from 2.5 to 84 wt.-%, and most preferably from 13 to 63 wt.-%.

According to one embodiment the aqueous suspension formed in step c) has a solids content from 1 to 90 wt.-%, based on the total weight of the aqueous suspension, preferably from 3 to 75 wt. %, more preferably from 5 to 50 wt.-%, even more preferably from 7 to 30 wt.-%, even still more preferably from 9 to 25 wt.-%, and most preferably from 10 to 20 wt.-%. According to a further embodiment step d) is carried out at a pH value from 4.5 to 14, preferably at a pH value from 4.7 to 13.5, more preferably at a pH value from 5 to 13, even more preferably at a pH value from 5.5 to 12.5, and most preferably at a pH value from 6 to 12. According to still a further embodiment step d) is carried out at a temperature from 0 to 110° C., preferably from 10 to 100° C., more preferably from 15 to 80° C., more preferably from 20 to 50° C., and most preferably at 20° C.±2° C.

According to one embodiment the dicalcium phosphate is produced by the following steps: i) providing a calcium ion source excluding dicalcium phosphate, ii) providing a phosphate ion source selected from phosphoric acid, a salt thereof, or a mixture thereof, and (iii) contacting the calcium ion source of step i) and the phosphate ion source of step ii) in the presence of water to form dicalcium phosphate, wherein the calcium ion source of step i) and the phosphate ion source of step ii) in combination are provided in a calcium ion to phosphate ion molar ratio from 1:2 to 5:1, preferably from 2:3 to 2:1, more preferably from 3:4 to 3:2, even more preferably from 5:6 to 4:3, still more preferably 10:11 to 11:10, and most preferably about 1:1. According to a further embodiment the calcium ion source of step i) is the same as the calcium salt of step a) of claim 1, and preferably is a calcium carbonate-comprising material, more preferably ground calcium carbonate, and/or the phosphate ion source of step ii) preferably is phosphoric acid.

According to one embodiment steps a) to c) are replaced by the following steps I) to III): I) providing a calcium ion source excluding dicalcium phosphate, II) providing a phosphate ion source selected from phosphoric acid, a salt thereof, or a mixture thereof, and III) forming an aqueous suspension by mixing the calcium ion source of step I) and the phosphate ion source of step II) in the presence of water to form dicalcium phosphate, and wherein the calcium ion source of step I) and the phosphate ion source of step II) in combination are provided in a calcium ion to phosphate ion molar ratio ($Ca^{2+}:PO_4^{3-}$) in the range from 1.75:1 to 100:1. According to a further embodiment the phosphate ion source is phosphoric acid, a hydrogen-free salt of phosphoric acid, a monohydrogen salt of phosphoric acid, preferably $Na_2HPO_4$, or a dihydrogen salt of phosphoric acid, or a mixture thereof, preferably the phosphate ion source is phosphoric acid, a dihydrogen salt of phosphoric acid, or a mixture thereof, preferably the phosphate ion source is selected from the group consisting of phosphoric acid, $NaH_2PO_4$, $KH_2PO_4$, $LiH_2PO_4$, $NH_4H_2PO_4$, $Ca(H_2PO_4)_2$, $Mg(H_2PO_4)_2$, and mixtures thereof.

According to one embodiment the surface-reacted calcium salt particles have a specific surface area (BET) of from 5 $m^2/g$ to 200 $m^2/g$, preferably from 10 $m^2/g$ to 180 $m^2/g$, more preferably from 20 $m^2/g$ to 170 $m^2/g$, even more preferably from 25 $m^2/g$ to 150 $m^2/g$, and most preferably from 30 $m^2/g$ to 100 $m^2/g$, measured using nitrogen and the BET method, and/or the surface-reacted calcium salt particles comprise a mass ratio of calcium carbonate to apatitic calcium phosphate, preferably hydroxylapatite, octacalcium phosphate, fluroroapatite, carboxyapatite, or mixtures thereof, more preferably hydroxylapatite, in the range from 0.05:1 to 59:1, preferably from 0.14:1 to 44:1, more preferably from 0.2:1 to 29:1, even more preferably from 0.3:1 to 15:1, and most preferably from 0.5:1 to 5:1. According to a further embodiment the surface-reacted calcium salt particles have a volume determined median particle size $d_{50}$(vol) from 0.5 to 75 µm, preferably from 1 to 50 µm, more preferably from 2 to 40 µm, even more preferably from 2.5 to 30 µm, and most preferably from 3 to 15 µm, and/or a volume determined top cut particle size $d_{98}$(vol) from 1 to 150 µm, preferably from 2 to 100 µm, more preferably from 4 to 80 µm, even more preferably from 5 to 60 µm, and most preferably from 6 to 30 µm.

It should be understood that for the purpose of the present invention, the following terms have the following meaning:

The term "acid" as used herein refers to an acid in the meaning of the definition by Brønsted and Lowry (e.g., $H_2SO_4$, $HSO_4$), wherein the term "free acid" refers only to those acids being in the fully protonated form (e.g., $H_2SO_4$).

A "calcium carbonate-comprising material" in the meaning of the present invention can be a mineral material or a synthetic material having a content of calcium carbonate of at least 50 wt.-%, preferably at least 75 wt.-%, more preferably at least 90 wt.-%, and most preferably at least 95 wt.-%, based on the total weight of the calcium carbonate-comprising material.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 μm pore size at 20° C. to recover the liquid filtrate, provide more than 1 g of recovered solid material following evaporation at 95 to 100° C. of 100 g of said liquid filtrate at ambient pressure.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

The term "surface-reacted" in the meaning of the present application shall be used to indicate that a material has been subjected to a process comprising partial dissolution of said material in aqueous environment followed by a crystallization process on and around the surface of said material, which may occur in the absence or presence of further crystallization additives.

The "particle size" of particulate materials other than surface-reacted calcium salt particles herein is described by its weight-based distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$(wt) unless indicated otherwise. Particle sizes were determined by using a Sedigraph™ 5100 instrument or Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium salt particles herein is described as volume-based particle size distribution. Volume-based median particle size $d_{50}$ was evaluated using a Malvern Mastersizer 2000 or 3000 Laser Diffraction System. The $d_{50}$ or $d_{98}$ value, measured using a Malvern Mastersizer 2000 or 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

A "salt" in the meaning of the present invention is a chemical compound consisting of an assembly of cations and anions (cf. IUPAC, Compendium of Chemical Terminology, $2^{nd}$ Ed. (the "gold book"), 1997, "salt").

The "specific surface area" (expressed in $m^2/g$) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained by multiplication of the specific surface area (in $m^2/g$) and the mass (in g) of the material.

For the purpose of the present invention, the "solids content" of a liquid composition is a measure of the amount of material remaining after all the solvent or water has been evaporated. If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 200° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

A "suspension" or "slurry" in the meaning of the present invention comprises undissolved solids and water, and optionally further additives, and usually contains large amounts of solids and, thus, is more viscous and can be of higher density than the liquid from which it is formed.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The inventive process for producing an aqueous suspension of surface-reacted calcium salt particles comprises the steps of: a) providing a calcium salt excluding monocalcium phosphate and dicalcium phosphate, b) providing a calcium phosphate selected from monocalcium phosphate and/or dicalcium phosphate, c) forming an aqueous suspension by mixing the calcium salt of step a), and the calcium phosphate of step b) with water, and d) grinding the aqueous suspension of step c) at a pH value of at least 4.2 to form an aqueous suspension of surface-reacted calcium salt particles. The calcium salt of step a) and the calcium phosphate of step b) in combination have a calcium ion to phosphate ion molar ratio ($Ca^{2+}:PO_4^{3-}$) in the range from 1.75:1 to 100:1.

In the following, preferred embodiments of the inventive process will be set out in more detail. It is to be understood that these embodiments and details also apply to the inventive products and uses.

Calcium Salt

According to process step a), a calcium salt excluding monocalcium phosphate and dicalcium phosphate is provided.

The calcium salt excluding monocalcium phosphate and dicalcium phosphate provided in process step a) may be selected from a calcium carbonate-comprising material, calcium oxide, calcium hydroxide, calcium chloride, calcium nitrate, calcium chlorate, calcium bromide, calcium iodide, calcium acetate, calcium sulphate, calcium citrate, or mixtures thereof.

According to one embodiment the calcium salt of step a) is selected from a calcium carbonate-comprising material, calcium chlorate, calcium bromide, calcium iodide, calcium acetate, calcium sulphate, or mixtures thereof, preferably the calcium salt of step a) is selected from a calcium carbonate-comprising material, calcium acetate, calcium sulphate, or mixtures thereof, and most preferably the calcium salt of step a) is a calcium carbonate-comprising material.

According to one embodiment the calcium carbonate-comprising material has a content of calcium carbonate of at least 50 wt.-%, preferably at least 75 wt.-%, more preferably at least 90 wt.-%, and most preferably at least 95 wt.-%, based on the total weight of the calcium carbonate-comprising material. According to another embodiment the at least one calcium carbonate-comprising material consists of calcium carbonate.

The calcium carbonate-comprising material may be selected from natural ground calcium carbonate, precipitated calcium carbonate, dolomite, or mixtures thereof, preferably the calcium carbonate-comprising material may be selected from natural ground calcium carbonate, precipitated calcium carbonate, or mixtures thereof. The natural ground calcium carbonate may be preferably selected from marble, limestone and/or chalk, and/or the precipitated calcium carbonate may be preferably selected from vaterite, calcite and/or aragonite.

"Natural ground calcium carbonate" (GCC) is understood to be manufactured from a naturally occurring form of calcium carbonate, mined from sedimentary rocks such as limestone or chalk, or from metamorphic marble rocks, or produced from eggshells, seashells, or corals. The source of the natural ground calcium carbonate may comprise further naturally occurring components such as magnesium carbonate, alumino silicate etc. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Natural ground calcium carbonate is almost exclusively of the calcitic polymorph, which is said to be trigonal-rhombohedral and represents the most stable form of the calcium carbonate polymorphs.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural ground calcium carbonate (GCC) is selected from marble, chalk, limestone, eggshells, seashells or corals, or mixtures thereof. Preferably, the natural ground calcium carbonate (GCC) is selected from marble, chalk, limestone, or mixtures thereof. According to one embodiment of the present invention the GCC is obtained by dry grinding. According to another embodiment of the present invention the GCC is obtained by wet grinding and subsequent drying.

According to one embodiment of the present invention, the natural ground calcium carbonate comprises one type of natural ground calcium carbonate. According to another embodiment of the present invention, the natural ground calcium carbonate comprises a mixture of two or more types of natural ground calcium carbonates selected from different sources.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, provided from more soluble salts such as, for example, $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. The obtained PCC slurry can be mechanically dewatered and dried.

According to one embodiment of the present invention, the precipitated calcium carbonate comprises aragonitic, vateritic or calcitic mineralogical crystal forms or mixtures thereof.

"Dolomite" in the meaning of the present invention is a calcium carbonate containing mineral, namely a carbonic calcium-magnesium-mineral, having the chemical composition of $CaMg(CO_3)_2$ ("$CaCO_3 \cdot MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment, the calcium salt of step a) is in form of particles having a weight median particle size $d_{50}$(wt) from 0.05 to 500 µm, preferably from 0.2 to 200 µm, more preferably from 0.4 to 100 µm, and most preferably from 0.6 to 20 µm. Additionally or alternatively, the calcium salt of step a) may be in form of particles having a weight top cut particle size $d_{98}$(wt) from 0.15 to 1500 µm, preferably from 1 to 600 µm, more preferably from 1.5 to 300 µm, and most preferably from 2 to 80 µm.

According to a preferred embodiment, the calcium salt of step a) is a calcium carbonate-comprising material, preferably ground calcium carbonate and/or precipitated calcium carbonate, more preferably ground calcium carbonate, and is in form of particles having a weight median particle size $d_{50}$(wt) from 0.05 to 500 µm, preferably from 0.2 to 200 µm, more preferably from 0.4 to 100 µm, and most preferably from 0.6 to 20 µm, and/or a weight top cut particle size $d_{98}$(wt) from 0.15 to 1500 µm, preferably from 1 to 600 µm, more preferably from 1.5 to 300 µm, and most preferably from 2 to 80 µm.

The calcium salt of step a) may have a specific surface area (BET) from 1 to 100 $m^2/g$, as measured using nitrogen and the BET method according to ISO 9277. According to one embodiment the specific surface area (BET) of the calcium salt of step a) is from 0.1 to 80 $m^2/g$, preferably from 0.2 to 60 $m^2/g$, more preferably from 0.3 to 40 $m^2/g$, and most preferably from 0.5 to 20 $m^2/g$ as measured using nitrogen and the BET method according to ISO 9277:2010.

The calcium salt of step a) may be provided in any form, for example, as solution, suspension, slurry, dispersion, paste, powder, moist filter cake or in pressed or granulated form. According to one embodiment, the calcium salt of step a) is provided in dry form, preferably in form of a powder.

According to another embodiment, the calcium salt of step a) is provided in form of an aqueous suspension. According to one embodiment, the calcium salt of step a) is in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the weight of the aqueous suspension. According to a preferred embodiment of the present invention, the aqueous suspension consists of water and the calcium salt of step a). Alternatively, the aqueous suspension of the calcium salt of step a) may comprise further additives, for example, a dispersant. Another suitable dispersant may be selected from the group comprising homopolymers or copolymers of polycarboxylic acid or salts thereof based on, for example, acrylic acid, methacrylic acid, maleic acid, fumaric acid or itaconic acid, and acrylamide, or mixtures thereof. Homopolymers or copolymers of acrylic acid are especially preferred. The homopolymer or copolymer can be fully in the acidic form or partially or fully neutralized. The weight average molecular weight $M_w$ of such products is preferably in the range from 2 000 to 15 000 g/mol, with a weight average molecular weight $M_w$ from 3 000 to 7 000 g/mol or 3 500 to 6 000 g/mol being especially preferred. According to an exemplary embodiment, the dispersant is sodium polyacrylate having a weight average molecular weight $M_w$ from 2 000 to 15 000 g/mol, preferably from 3 000 to 7 000 g/mol, and most preferably from 3 500 to 6 000 g/mol.

According to still another embodiment, the calcium salt of step a) is provided in form of an aqueous solution. According to a preferred embodiment, the calcium salt of step a) is in form of an aqueous solution comprising the calcium salt in an amount from 1 to 95 wt.-%, preferably from 10 to 90 wt.-%, more preferably from 20 to 80 wt.-%, and most preferably from 30 to 70 wt.-%, based on the weight of the aqueous solution.

According to one embodiment of the present invention, the calcium salt of step a) is a calcium carbonate-comprising material, preferably natural ground calcium carbonate and/or precipitated calcium carbonate, and more preferably natural ground calcium carbonate and/or precipitated calcium carbonate provided in dry form.

Calcium Phosphate

According to step b) of the process of the present invention, a calcium phosphate selected from monocalcium phosphate and/or dicalcium phosphate is provided. The calcium salt excluding monocalcium phosphate and dicalcium phosphate of step a) and the calcium phosphate selected from monocalcium phosphate and/or dicalcium phosphate of step b) in combination have a calcium ion to phosphate ion molar ratio ($Ca^{2+}:PO_4^{3-}$) in the range from 1.75:1 to 100:1.

For the purpose of the present invention, the term "monocalcium phosphate" refers to the inorganic compound with the chemical formula $Ca(H_2PO_4)_2$ and hydrates thereof. Examples of monocalcium phosphate are anhydrous monocalcium phosphate ($Ca(H_2PO_4)_2$) or monocalcium phosphate monohydrate ($Ca(H_2PO_4)_2 \cdot H_2O$).

A "dicalcium phosphate" in the meaning of the present invention refers to the inorganic compound with the chemical formula $CaHPO_4$ and hydrates thereof. Examples of dicalcium phosphate are anhydrous dicalcium phosphate ($CaHPO_4$) such as the mineral monetite, dicalcium phosphate hemihydrate ($CaHPO_4 \cdot 0.5H_2O$), or dicalcium phosphate dihydrate ($CaHPO_4 \cdot 2H_2O$), such as the mineral brushite.

According to one embodiment, the calcium phosphate provided in step b) of the process of the present invention is selected from anhydrous monocalcium phosphate ($Ca(H_2PO_4)_2$), monocalcium phosphate monohydrate ($Ca(H_2PO_4)_2 \cdot H_2O$), anhydrous dicalcium phosphate ($CaHPO_4$), dicalcium phosphate hemihydrate ($CaHPO_4 \cdot 0.5H_2O$), dicalcium phosphate dihydrate ($CaHPO_4 \cdot 2H_2O$), or mixtures thereof, preferably the calcium phosphate provided in step b) of the process of the present invention is selected from anhydrous dicalcium phosphate ($CaHPO_4$), dicalcium phosphate hemihydrate ($CaHPO_4 \cdot 0.5H_2O$), dicalcium phosphate dihydrate ($CaHPO_4 \cdot 2H_2O$), or mixtures thereof, and more preferably the calcium phosphate provided in step b) of the process of the present invention is dicalcium phosphate dihydrate ($CaHPO_4 \cdot 2H_2O$).

According to one embodiment, the calcium phosphate provided in step b) of the process of the present invention is a dicalcium phosphate, preferably selected from anhydrous dicalcium phosphate ($CaHPO_4$), dicalcium phosphate hemihydrate ($CaHPO_4 \cdot 0.5H_2O$), dicalcium phosphate dihydrate ($CaHPO_4 \cdot 2H_2O$), or mixtures thereof, and more preferably the dicalcium phosphate is dicalcium phosphate dihydrate ($CaHPO_4 \cdot 2H_2O$).

According to one embodiment the calcium salt excluding monocalcium phosphate and dicalcium phosphate of step a) and the calcium phosphate selected from monocalcium phosphate and/or dicalcium phosphate of step b) in combination have a calcium ion to phosphate ion molar ratio ($Ca^{2+}:PO_4^{3-}$) in the range from 1.9:1 to 75:1, preferably from 2:1 to 50:1, more preferably from 2.2:1 to 25:1, and most preferably from 2.5:1 to 10:1.

According to one embodiment the calcium phosphate of step b) is dicalcium phosphate dihydrate and is provided in an amount from 1.7 to 230 wt.-%, based on the total weight of the calcium salt excluding monocalcium phosphate and dicalcium phosphate, preferably from 2.3 to 191 wt.-%, more preferably from 3.5 to 172 wt.-%, and most preferably from 19 to 115 wt.-%.

According to one embodiment the calcium phosphate of step b) is dicalcium phosphate hemihydrate and is provided in an amount from 1.7 to 230 wt.-%, based on the total weight of the calcium salt excluding monocalcium phosphate and dicalcium phosphate, preferably from 2.3 to 191 wt.-%, more preferably from 3.5 to 172 wt.-%, and most preferably from 19 to 115 wt.-%.

According to one embodiment the calcium phosphate of step b) is anhydrous dicalcium phosphate and is provided in an amount from 1.4 to 181 wt.-%, based on the total weight of the calcium salt excluding monocalcium phosphate and dicalcium phosphate, preferably from 1.8 to 151 wt.-%, more preferably from 2.8 to 136 wt.-%, and most preferably from 15 to 91 wt.-%.

According to one embodiment the calcium phosphate of step b) is anhydrous monocalcium phosphate and is provided in an amount from 1.2 to 94 wt.-%, based on the total weight of the calcium salt excluding monocalcium phosphate and dicalcium phosphate, preferably from 1.6 to 84 wt.-%, more preferably from 2.4 to 78 wt.-%, and most preferably from 12 to 59 wt.-%.

According to one embodiment the calcium phosphate of step b) is monocalcium phosphate monohydrate and is provided in an amount from 1.3 to 100.1 wt.-%, based on the total weight of the calcium salt excluding monocalcium phosphate and dicalcium phosphate, preferably from 1.7 to 90 wt.-%, more preferably from 2.5 to 84 wt.-%, and most preferably from 13 to 63 wt.-%.

According to one embodiment, the calcium phosphate of step b) is in form of particles having a weight median particle size $d_{50}(wt)$ from 0.05 to 500 μm, preferably from 0.2 to 200 μm, more preferably from 0.4 to 100 μm, and most preferably from 0.6 to 40 μm. Additionally or alternatively, the calcium phosphate of step b) may be in form of particles having a weight top cut particle size $d_{98}(wt)$ from 0.15 to 1500 μm, preferably from 1 to 600 μm, more preferably from 1.5 to 300 μm, and most preferably from 2 to 110 μm.

According to one embodiment, the calcium phosphate of step b) is a dicalcium phosphate and is in form of particles having a weight median particle size $d_{50}(wt)$ from 0.05 to 500 μm, preferably from 0.2 to 200 μm, more preferably from 0.4 to 100 μm, and most preferably from 0.6 to 40 μm, and/or a weight top cut particle size $d_{98}(wt)$ from 0.15 to 1500 μm, preferably from 1 to 600 μm, more preferably from 1.5 to 300 μm, and most preferably from 2 to 110 μm.

The calcium phosphate of step b) may have a specific surface area (BET) from 0.1 to 200 $m^2/g$, as measured using nitrogen and the BET method according to ISO 9277:2010. According to one embodiment the specific surface area (BET) of the calcium phosphate of step b) is from 0.2 to 100 $m^2/g$, preferably from 0.3 to 60 $m^2/g$, and more preferably from 0.5 to 30 $m^2/g$, as measured using nitrogen and the BET method according to ISO 9277:2010.

The calcium phosphate of step b) may be provided in any form, for example, as suspension, slurry, dispersion, paste, powder, moist filter cake or in pressed or granulated form. According to one embodiment, the calcium phosphate of step b) is provided in dry form, preferably in form of a powder.

According to another embodiment, the calcium phosphate of step b) is provided in form of an aqueous suspension, preferably having a solids content within the range of 1 to 90 wt.-%, more preferably from 3 to 60 wt.-%, even more preferably from 5 to 40 wt.-%, and most preferably from 10 to 25 wt.-%, based on the weight of the aqueous suspension. According to a preferred embodiment of the present invention, the aqueous suspension consists of water and the calcium phosphate of step b). Alternatively, the aqueous suspension of the calcium phosphate of step b) may comprise further additives, for example, a dispersant. Another suitable dispersant may be selected from the group comprising homopolymers or copolymers of polycarboxylic acid or salts thereof based on, for example, acrylic acid, methacrylic acid, maleic acid, fumaric acid or itaconic acid, and acrylamide, or mixtures thereof. Homopolymers or copolymers of acrylic acid are especially preferred. The homopolymer or copolymer can be fully in the acidic form or partially or fully neutralized. The weight average molecular weight $M_w$ of such products is preferably in the range from 2 000 to 15 000 g/mol, with a weight average molecular weight $M_w$ from 3 000 to 7 000 g/mol or 3 500 to 6 000 g/mol being especially preferred. According to an exemplary embodiment, the dispersant is sodium polyacrylate having a weight average molecular weight $M_w$ from 2 000 to 15 000 g/mol, preferably from 3 000 to 7 000 g/mol, and most preferably from 3 500 to 6 000 g/mol.

Monocalcium phosphate and dicalcium phosphate are commercially available or may be produced on site, for example, by treating calcium hydroxide or calcium carbonate with phosphoric acid.

According to one embodiment, the calcium phosphate provided in process step b) is dicalcium phosphate. The dicalcium phosphate may be produced in-situ or in a separate process.

According to one embodiment the separate process for producing dicalcium phosphate comprises the following steps:
i) providing a calcium ion source excluding dicalcium phosphate,
ii) providing a phosphate ion source selected from phosphoric acid, a salt thereof, or a mixture thereof, and
iii) contacting the calcium ion source of step i) and the phosphate ion source of step ii) in the presence of water to form dicalcium phosphate,
wherein the calcium ion source of step i) and the phosphate ion source of step ii) in combination are provided in a calcium ion to phosphate ion molar ratio from 1:2 to 5:1.

According to another embodiment the dicalcium phosphate is produced in-situ in the process of the present invention. Accordingly, process steps a) to c) of the process of the present invention would be replaced by process steps i) to iii) described above, i.e. process steps a) to c) would be replaced by the following steps I) to III):
I) providing a calcium ion source excluding dicalcium phosphate,
II) providing a phosphate ion source selected from phosphoric acid, a salt thereof, or a mixture thereof, and
III) forming an aqueous suspension by mixing the calcium ion source of step I) and the phosphate ion source of step II) in the presence of water to form dicalcium phosphate.

Thus, the in-situ process for producing an aqueous suspension of surface-reacted calcium salt particles may comprise the steps of:
I) providing a calcium ion source excluding dicalcium phosphate,
II) providing a phosphate ion source selected from phosphoric acid, a salt thereof, or a mixture thereof, and
III) forming an aqueous suspension by mixing the calcium ion source of step I) and the phosphate ion source of step II) in the presence of water to form dicalcium phosphate, and
IV) grinding the aqueous suspension of step III) at a pH value of at least 4.2 to form an aqueous suspension of surface-reacted calcium carbonate particles,
wherein the calcium ion source of step I) and the phosphate ion source of step II) in combination are provided in a calcium ion to phosphate ion molar ratio ($Ca^{2+}$:$PO_4^{3-}$) in the range from 1.75:1 to 100:1.

Unless indicated otherwise, the following explanations and embodiments apply to both the separate process for producing dicalcium phosphate and the in-situ process for producing an aqueous suspension of surface-reacted calcium salt particles, in which the dicalcium phosphate is formed in-situ.

The calcium ion source may be selected from a calcium carbonate-comprising material, calcium oxide, calcium hydroxide, calcium chloride, calcium nitrate, calcium chlorate, calcium bromide, calcium iodide, calcium acetate, calcium sulphate, calcium citrate, or mixtures thereof. According to one embodiment the calcium ion source excludes calcium phosphate.

According to one embodiment the calcium ion source is selected from a calcium carbonate-comprising material, calcium chlorate, calcium bromide, calcium iodide, calcium acetate, calcium sulphate, or mixtures thereof, preferably the calcium ion source is selected from a calcium carbonate-comprising material, calcium acetate, calcium sulphate, or mixtures thereof, and most preferably the calcium ion source is a calcium carbonate-comprising material. According to a preferred embodiment, the calcium ion source is a calcium carbonate-comprising material, preferably selected from natural ground calcium carbonate, precipitated calcium carbonate, dolomite, or mixtures thereof, more preferably selected from natural ground calcium carbonate, precipitated calcium carbonate, or mixtures thereof, and most preferably the calcium carbonate-comprising material is ground calcium carbonate.

The calcium ion source may also be selected from a waste material or by-product containing calcium compounds in an acid soluble form. For example, the waste material or by-product may be selected from industrial reject material, recycled waste material, waste material derived from pulp— and/or papermaking industry, industrial gypsum wastes, or pigment-discoloured natural calcitic material.

The calcium ion source can be provided in solid form or in form of an aqueous suspension or an aqueous solution.

According to one embodiment, the calcium ion source is provided in form of a solution, preferably comprising the calcium ion source in an amount from 0.1 to 99 wt.-%, based on the total weight of the aqueous solution, more preferably in an amount from 1 to 80 wt.-%, even more preferably in an amount from 10 to 50 wt.-%, and most preferably in an amount from 20 to 40 wt.-%. According to another embodiment the calcium ion source is provided in form of an aqueous suspension, preferably comprising the calcium ion source in an amount from 0.1 to 99 wt.-%, based on the total weight of the aqueous suspension, preferably in an amount from 1 to 80 wt.-%, more preferably in an amount from 10 to 50 wt.-%, and most preferably in an amount from 20 to 40 wt.-%.

According to one embodiment, the calcium ion source provided in step i) of the afore mentioned separate process for producing dicalcium phosphate is the same as the calcium salt provided in step a) of the process of the present invention, and preferably is a calcium carbonate-comprising material, more preferably ground calcium carbonate.

According to one embodiment, the calcium ion source provided in step I) of the afore mentioned in-situ process is selected from the materials as described for the calcium salt of step a) above, and preferably is a calcium carbonate-comprising material, more preferably ground calcium carbonate.

According to one embodiment, the phosphate ion source is phosphoric acid. According to another embodiment, the phosphate ion source is a salt of phosphoric acid, e.g. a hydrogen-free salt, a monohydrogen salt, preferably $Na_2HPO_4$, or a dihydrogen salt of phosphoric acid, preferably the phosphate ion source is a dihydrogen salt of phosphoric acid, more preferably selected from the group consisting of $NaH_2PO_4$, $KH_2PO_4$, $LiH_2PO_4$, $NH_4H_2PO_4$, $Ca(H_2PO_4)_2$, $Mg(H_2PO_4)_2$, and mixtures thereof. The phosphate ion source may also be a mixture of phosphoric acid and a salt thereof. According to one embodiment the phosphate ion source is a mixture of phosphoric acid and a hydrogen-free salt, a monohydrogen salt, preferably $Na_2HPO_4$, or a dihydrogen salt thereof, preferably a mixture of phosphoric acid and a dihydrogen salt thereof, and more preferably a mixture of phosphoric acid and a dihydrogen salt thereof selected from the group consisting of $NaH_2PO_4$, $KH_2PO_4$, $LiH_2PO_4$, $NH_4H_2PO_4$, $Ca(H_2PO_4)_2$, $Mg(H_2PO_4)_2$ and mixtures thereof. The skilled person will appreciate that both the anhydrous forms and hydrates of the afore-mentioned salts of phosphoric acid can be used.

In addition, the phosphate ion source may comprise other suitable phosphate ion sources. For example, the phosphate ion source may comprise dibasisc or tribasic salts of phosphoric acid.

The phosphate ion source may also be obtained from a waste material or by-product containing phosphoric acid, a dihydrogen salt thereof, or a mixture thereof.

The phosphate ion source can be provided in solid form or in form of an aqueous suspension or an aqueous solution.

According to one embodiment, the phosphate ion source is provided in form of a solution, preferably comprising the phosphate ion source in an amount from 0.1 to 99 wt.-%, based on the total weight of the aqueous solution, more preferably in an amount from 1 to 80 wt.-%, even more preferably in an amount from 10 to 50 wt.-%, and most preferably in an amount from 20 to 40 wt.-%. According to another embodiment the phosphate ion source is provided in form of an aqueous suspension, preferably comprising the phosphate ion source in an amount from 0.1 to 99 wt.-%, based on the total weight of the aqueous suspension, preferably in an amount from 1 to 80 wt.-%, more preferably in an amount from 10 to 50 wt.-%, and most preferably in an amount from 20 to 40 wt.-%.

According to one embodiment, the phosphate ion source is provided in solid form, preferably in form of a powder. The powder may contain small amounts of moisture, e.g. up to 1 wt.-%, based on the total weight of the powder.

According to one embodiment, in the separate process for producing dicalcium phosphate comprising steps i) to iii), the calcium ion source of step i) and the phosphate ion source of step ii) in combination are provided in a calcium ion to phosphate ion molar ratio $(Ca_2^+:PO_4^{3-})$ from 2:3 to 2:1, preferably from 3:4 to 3:2, more preferably from 5:6 to 4:3, still more preferably from 10:11 to 11:10 and most preferably about 1:1

According to one embodiment, in the in-situ process comprising steps I) to IV, wherein dicalcium phosphate is formed in-situ, the calcium ion source of step I) and the phosphate ion source of step II) in combination are provided in a calcium ion to phosphate ion molar ratio $(Ca^{2+}:PO_4^{3-})$ from 2:1 to 9:1, preferably from 3:1 to 8:1, more preferably from 4:1 to 7:1, and most preferably from 5:1 to 6:1. According to another embodiment, in the in-situ process comprising steps I) to IV, wherein dicalcium phosphate is formed in-situ, the calcium ion source of step I) and the phosphate ion source of step II) in combination may be provided in a calcium ion to phosphate ion molar ratio $(Ca^{2+}:PO_4^{3-})$ in the range from 1.9:1 to 75:1, preferably from 2:1 to 50:1, more preferably from 2.2:1 to 25:1, and most preferably from 2.5:1 to 10:1.

According to one embodiment, in the separate process for producing dicalcium phosphate comprising steps i) to iii), the process step iii) is carried out at a pH value below 5, preferably at a pH value from 1.0 to 4.9, more preferably from 1.1 to 4.7, even more preferably from 1.8 to 4.2, and most preferably from 2.2 to 4.0. The pH value may be controlled by the amount of phosphate ion source.

Process for Producing an Aqueous Suspension of Surface-Reacted Calcium Salt Particles According to process step c) of the process of the present invention, an aqueous suspension is formed by mixing the calcium salt excluding monocalcium phosphate and dicalcium phosphate of step a), and the calcium phosphate selected from monocalcium phosphate and/or dicalcium phosphate of step b) with water.

Unless indicated otherwise, the following explanations and embodiments also apply to the in-situ process for producing an aqueous suspension of surface-reacted calcium salt particles comprising steps I) to IV) defined above, in which dicalcium phosphate is formed in-situ. The skilled person will understand that in said case, process step a) corresponds to process step I), process step b) corresponds to process step II), process step c) corresponds to process step III), and process step d) corresponds to process step IV).

Suitable mixing methods are known to the skilled person. Examples of suitable mixing methods are shaking, mixing, stirring, agitating, ultrasonication, or inducing a turbulent or laminar flow by means such as baffles or lamellae. Suitable mixing equipment is known to the skilled person, and may be selected, for example, from stirrers, such as rotor stator systems, blade stirrers, propeller stirrers, turbine stirrers, or anchor stirrers, static mixers such as pipes including baffles or lamellae. According to an exemplary embodiment of the present invention, a rotor stator stirrer system is used. The skilled person will adapt the mixing conditions such as the mixing speed and temperature according to his process equipment.

Depending on the amount of water that is introduced during process steps a) and b) additional water may be introduced during process step c), for example, in order to control and/or maintain and/or achieve the desired solids content or Brookfield viscosity of the obtained aqueous suspension. According to one embodiment, the aqueous suspension formed in step c) has a solids content from 1 to 90 wt.-%, based on the total weight of the aqueous suspension, preferably from 3 to 75 wt.-%, more preferably from 5 to 50 wt.-%, even more preferably from 7 to 30 wt.-%, still more preferably 9 to 25 wt.-%, and most preferably from 10 to 20 wt.-%. The Brookfield viscosity of the obtained aqueous suspension may be from 10 to 10 000 mPa·s, preferably from 50 to 5 000 mPa·s, more preferably from 100 to 1000 mPa·s, and most preferably 200 to 800 mPa·s.

According to one embodiment, the starting materials, i.e. the calcium salt of step a) and the calcium phosphate of step b), exhibit room temperature, i.e. they have a temperature of 20° C.±2° C. The starting materials may be mixed in any order. According to one embodiment, step c) comprises the steps of:

C1) mixing the calcium salt of step a) with water, and

C2) mixing the calcium phosphate of step b) with the mixture of step C1).

According to another embodiment, step c) comprises the steps of:

C1') mixing the calcium phosphate of step b) with water, and

C2') mixing the calcium salt of step a) with the mixture of step C1'.

According to still another embodiment, the calcium salt of step a), the calcium phosphate of step b), and water are mixed simultaneously.

According to process step d) of the process of the present invention, the aqueous suspension of step c) is ground at a pH value of at least 4.2 to form an aqueous suspension of surface-reacted calcium salt particles.

In general, the process step d) can be carried out with any conventional grinding device, for example, under conditions such that refinement predominantly results from impacts with a secondary body, e.g. in one or more of: a ball mill, a rod mill, a vibrating mill, a sand mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. The grinding step d) may be also performed under conditions such that autogenous grinding takes place and/or by horizontal and or vertical ball milling, and/or other such processes known to the skilled man.

According to one embodiment, step d) is carried out in a ball mill, a rod mill, a vibrating mill, a centrifugal impact mill, a vertical bead mill, an attrition mill, a sand mill, or combinations thereof. Preferably, the grinding step d) may be carried out in a ball mill.

It has to be noted that process step d) may be carried out in at least one grinding device, i.e. it is also possible to use a series of grinding devices.

According to one embodiment, process step d) is carried out in one grinding device. According to another embodiment, process step d) is carried out in a series of grinding devices, preferably in a series of two, three, four or five grinding devices. According to one embodiment, process step d) is carried out in a series of grinding devices, wherein additional calcium phosphate selected from monocalcium phosphate and/or dicalcium phosphate is added after the first grinding device and before at least one of the subsequent grinding devices of the series of grinding devices. For example, process step d) is carried out in a series of two grinding devices and additional calcium phosphate selected from monocalcium phosphate and/or dicalcium phosphate is added after the first grinding device and before the second grinding device. According to another example, process step d) is carried out in a series of three grinding devices and additional calcium phosphate selected from monocalcium phosphate and/or dicalcium phosphate is added after the first grinding device and before the second grinding device and after the second grinding device and before the third grinding device.

It is a requirement of the inventive process that step d) is carried out at a pH of at least 4.2 in order to ensure that calcium salt excluding monocalcium phosphate and dicalcium phosphate and the calcium phosphate selected from monocalcium phosphate and/or dicalcium phosphate are converted into surface-reacted calcium salt particles during process step d). According to one embodiment, process step d) is carried out at a pH value from 4.5 to 14, preferably from 4.7 to 13.5, more preferably from 5 to 13, even more preferably from 5.5 to 12.5, and most preferably from 6 to 12. If necessary, the pH of the aqueous suspension obtained in step c) may be adjusted by all means known in the art. According to one embodiment, the pH of the aqueous suspension obtained in step c) is adjusted to a pH value of at least 4.2 by the addition of potassium hydroxide, sodium hydroxide, ammonium hydroxide, or mixtures thereof.

Depending on the amount of water that is introduced during process steps a), b), and c) additional water may be introduced during process step d), for example, in order to control and/or maintain and/or achieve the desired solids content or Brookfield viscosity of the obtained aqueous suspension. According to one embodiment, process step d) is carried out at a solids content from 1 to 90 wt.-%, based on the total weight of the aqueous suspension, preferably from 3 to 75 wt.-%, more preferably from 5 to 50 wt.-%, even more preferably from 7 to 30 wt.-%, still more preferably 9 to 25 wt.-%, and most preferably from 10 to 20 wt.-%. The Brookfield viscosity of the aqueous suspension may be from 10 to 10 000 mPa·s, preferably from 50 to 5 000 mPa·s, more preferably from 100 to 1000 mPa·s, and most preferably 200 to 800 mPa·s.

The process step d) may be carried out at room temperature, i.e. at 20° C.±2° C., or at other temperatures. According to one embodiment of the present invention, step d) is carried out at a temperature from 0 to 110° C., preferably from 10 to 100° C., more preferably from 15 to 80° C., more preferably from 20 to 50° C., and most preferably at 20° C.±2° C. Heat may be introduced by internal shear or by an external source or a combination thereof. If necessary, step d) may be carried out under cooling conditions using methods and equipment known in the art.

According to one embodiment of the present invention, step d) is carried out at a starting temperature from 0 to 110° C., preferably from 10 to 100° C., more preferably from 15 to 80° C., more preferably from 20 to 50° C., and most preferably at 20° C.±2° C.

In case the inventive process is carried out as an in-situ process comprising steps I) to IV) defined above, step IV) is preferably carried out at temperature from 0 to 35° C., more preferably from 5 to 30° C., and most preferably from 10 to 25° C. According to one embodiment, in the in-situ process comprising steps I) to IV) defined above, step IV) is carried out at a starting temperature from 0 to 35° C., preferably from 5 to 30° C., and most preferably from 10 to 25° C.

According to one embodiment, step d) is carried out for a period of time in the range from 10 sec to 5 hours, preferably from 30 sec to 2 hours, more preferably from 1 min to 60 min, even more preferably from 5 to 40 min, and most preferably from 10 min to 30 min.

The process step d) may be carried out at any suitable specific grinding energy (SGE), determined through first recording simultaneously the electrical power consumption (P) of the grinding device, given in kW, and the volumetric flow rate ($v_s$) of the feeding slurry, given in m$^3$/h, and as indicated in the respective monitoring displays. Further, the total solids (TS) content of the feeding slurry, given in wt.-% was determined using a Moisture Analyzer HR73 from Mettler-Toledo (T=120° C., automatic switch off 3, standard drying) with a sample size of 5 to 20 g. Assuming the density of water ($\rho_w$) to be 1.00 T/m$^3$ and the density of the applied dry calcium carbonate/marble/chalk ($\rho_c$) to be 2.71 T/m$^3$, the SGE can be calculated as the function of the given quantities, as expressed in equations (1), (2) and (3).

$$SGE = P/((TS) \cdot m_s) \qquad \text{Eq. (1)}$$

$$m_s = \rho_s \cdot v_s \qquad \text{Eq. (2)}$$

$$\rho_s = [\rho_c \cdot \rho_w]/[\rho_c \cdot (1-(TS)) + \rho_w \cdot (TS)] \qquad \text{Eq. (3)}$$

According to one embodiment, step d) is carried out at a specific grinding energy from 50 to 500 kWh per dry metric tonne of end product, preferably from 70 to 450 kWh per dry metric tonne of end product, more preferably from 150 to 350 kWh per dry metric tonne of end product, and most preferably from 200 to 300 kWh per dry metric tonne of end product.

According to one embodiment, the process step d) is carried out until the fraction of surface-reacted calcium salt particles having a particle size of less than 4 µm is greater than 10 vol.-%, preferably greater than 20 vol.-%, more preferably greater than 30 vol.-%, and most preferably greater than 50 vol.-%, based on the total volume of the surface-reacted calcium salt particles.

According to one embodiment of the present invention, the process step d) can be carried out in form of a batch process, a semi-continuous process, or a continuous process. According to a preferred embodiment of the present invention process step d) is carried out in form of a continuous process.

The surface-reacted calcium salt particles obtained by process step d) may have a volume determined median particle size $d_{50}$(vol) from 0.05 to 30 µm, preferably from 0.1 to 20 µm, more preferably from 0.5 to 15 µm, even more preferably from 1 to 10 µm, and most preferably from 2 to 5 µm. Additionally or alternatively, the surface-reacted calcium salt particles obtained in step d) may have a volume determined top cut particle size $d_{98}$(vol) from 0.15 to 150 µm, preferably from 2 to 100 µm, more preferably from 4 to 80 µm, even more preferably from 5 to 60 µm, and most preferably from 6 to 30 µm.

The inventors surprisingly found that the co-grinding of a calcium phosphate selected from monocalcium phosphate and/or dicalcium phosphate with various calcium ion sources at a pH of at least 4.2 results in the formation of surface-reacted calcium salt particles with small particle size and high specific surface areas. Without being bound to any theory, the inventors believe that the grinding step of the inventive process provides the benefit that the (chemical) reaction speed of the inventive process is increased by continuously producing a freshly prepared and hence reactive surface of starting materials. In addition, the inventors found that the inventive process can utilize coarse starting materials as well as starting materials, which have a lower quality, e.g. in that they contain certain impurities. This provides the possibility to utilize materials such as by-products of other processes or waste-materials, which are difficult to use in conventional processes for producing surface-reacted calcium salt particles.

Furthermore, it was found by the inventors of the present invention that the energy introduced by the grinding step can be sufficient to induce the conversion into surface-reacted calcium salt particles. This provides the possibility to operate the process at low temperatures and/or with starting materials having room temperature, i.e. a temperature of 20° C.±2° C., and hence, decreases production costs. Another advantage of the inventive process is that it can be carried out with standard milling equipment and can be carried out as a continuous process, which facilitates the production of surface-reacted calcium salt particles. Moreover, the inventive process does not require the addition of carbon dioxide.

The process of the present invention can be carried out in form of a batch process, a semi-continuous process, or a continuous process. Process steps c) and/or d) may be repeated one or several times, if appropriate.

In a batch process, a vessel may be provided, in which the calcium salt of step a) and the calcium phosphate of step b) are mixed with water to form an aqueous suspension in accordance with process step c). Subsequently, the aqueous suspension obtained in step c) is transferred to a grinding device, wherein the aqueous suspension is ground at a pH value of at least 4.2 to form an aqueous suspension of surface-reacted calcium salt particles.

According to one exemplary batch process, a first vessel including a mixing device, a second vessel including a mixing device, and a third vessel are provided. In a first step, the calcium salt of step a) and water are mixed in the first vessel. Subsequently, the obtained mixture is transferred to the second vessel, wherein the calcium phosphate of step b) is added. The obtained aqueous suspension is stored in a third vessel, from which it is transferred to a grinding device, wherein the aqueous suspension is ground at a pH value of at least 4.2 to form an aqueous suspension of surface-reacted calcium salt particles. It may be preferable to equip the third vessel with a low-speed mixer in order to mix the aqueous suspension for a prolonged time, for example, for several days.

According to another exemplary batch process, a first vessel including a mixing device, a second vessel including a mixing device, and a third vessel including a mixing device are provided. In a first step, dicalcium phosphate is produced separately by mixing the calcium ion source of step i), the phosphate ion source of step ii), and water in the first vessel. The calcium salt of step a) and water are mixed in the second vessel. Subsequently, the mixture of the first vessel is added to the mixture of the second vessel. The obtained aqueous suspension is stored in a third vessel, from which it is transferred to a grinding device, wherein the aqueous suspension is ground at a pH value of at least 4.2 to form an aqueous suspension of surface-reacted calcium salt particles. As noted above, it may be preferable to equip the third vessel with a low-speed mixer.

In a continuous process, a vessel and a grinding device may be provided. The calcium salt of step a), the calcium phosphate of step b), and water may be fed to the vessel separately or together, wherein calcium salt step a), the calcium phosphate of step b), and water are mixed, and the formed aqueous suspension is continuously transferred to the grinding device. In the grinding device the aqueous suspension is ground at a pH value of at least 4.2 to form an aqueous suspension of surface-reacted calcium salt particles, which is continuously discharged from the grinding unit.

According to a preferred embodiment, the process for producing surface-reacted calcium salt particles comprises the following steps:
 a) providing a calcium salt excluding monocalcium phosphate and dicalcium phosphate, wherein the calcium salt is selected from a calcium carbonate-comprising material, preferably ground calcium carbonate,
 b) providing a calcium phosphate selected from monocalcium phosphate and/or dicalcium phosphate, wherein the calcium phosphate is dicalcium phosphate,
 c) forming an aqueous suspension by mixing the calcium salt of step a), and the calcium phosphate of step b) with water, and
 d) grinding the aqueous suspension of step c) at a pH value of at least 4.2 to form an aqueous suspension of surface-reacted calcium salt particles,
 wherein the calcium salt of step a) and the calcium phosphate of step b) in combination have a calcium ion to phosphate ion molar ratio ($Ca^{2+}:PO_4^{3+}$) in the range from 1.75:1 to 100:1.

Preferably the calcium salt is provided in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the total weight of the aqueous suspension, and/or the calcium salt is in form of particles having a weight median particle size $d_{50}$(wt) from 0.05 to 500 µm, preferably from 0.2 to 200 µm, more preferably from 0.4 to 100 µm, and most preferably from 0.6 to 40 µm.

Preferably the calcium phosphate is provided in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the total weight of the aqueous suspension, and/or the calcium phosphate is in form of particles having a weight median particle size $d_{50}$(wt) from 0.05 to 500 µm, preferably from 0.2 to 200 µm, more preferably from 0.4 to 100 µm, and most preferably from 0.6 to 40 µm.

According to another preferred embodiment, process for producing an aqueous suspension of surface-reacted calcium salt particles comprises the steps of:
 I) providing a calcium ion source excluding dicalcium phosphate, wherein the calcium ion source is selected from a calcium carbonate-comprising material, preferably ground calcium carbonate, II) providing a phosphate ion source selected from phosphoric acid, and III) forming an aqueous suspension by mixing the calcium ion source of step I) and the phosphate ion source of step II) in the presence of water to form dicalcium phosphate, IV) grinding the aqueous suspension of step III) at a pH value of at least 4.2 to form an aqueous suspension of surface-reacted calcium salt particles, wherein the calcium ion source of step I) and the phosphate ion source of step II) in combination are provided in a calcium ion to phosphate ion molar ratio ($Ca^{2+}$: $PO_4^{3-}$) in the range from 1.75:1 to 100:1.

Preferably the calcium ion source is provided in form of an aqueous suspension having a solids content within the range from 1 to 90 wt.-%, preferably from 3 to 60 wt.-%, more preferably from 5 to 40 wt.-%, and most preferably from 10 to 25 wt.-%, based on the total weight of the aqueous suspension, and/or the calcium ion source is in form of particles having a weight median particle size $d_{50}(wt)$ from 0.05 to 500 µm, preferably from 0.2 to 200 µm, more preferably from 0.4 to 100 µm, and most preferably from 0.6 to 40 µm.

Additional Process Steps

According to a further, optional embodiment, the solids content of the aqueous suspension obtained by the process according to the present invention can be adjusted. The solids content of the aqueous suspension can be adjusted by the methods known to the skilled person. To adjust the solids content of an aqueous suspension of surface-reacted calcium salt particles, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the suspension until the desired solids content is obtained. Additionally or alternatively, a suspension having an appropriate lower content of solid particles may be added to the aqueous suspension of surface-reacted calcium salt particles until the desired solid content is obtained. The solids content of the aqueous suspension obtained by the inventive process can also be adjusted by concentration methods known to the skilled person. The concentration of the aqueous suspension may be achieved by means of a thermal process, for example, in an evaporator under ambient, atmospheric pressure or at reduced pressure, or by means of a mechanical process, for example, in a filter press, such as nanofiltration, and/or centrifuge.

According to one optional embodiment, the process according to the present invention further comprises the step of adjusting the solids content of the aqueous suspension of surface-reacted calcium salt particles formed in step d) or in step IV) of the in-situ process. According to one embodiment of the present invention, the solids content of the aqueous suspension of surface-reacted calcium salt particles formed in step d) or step IV) is adjusted so that it is from 20 to 60 wt.-%, preferably from 25 to 50 wt.-%, and more preferably from 30 to 45 wt.-%, based on the total weight of the suspension.

The aqueous suspension of surface-reacted calcium salt particles may be further processed, e.g., the surface-reacted calcium salt particles may be separated from the aqueous suspension and/or subjected to a drying step.

According to one embodiment of the present invention, the process further comprises a step e) of separating the surface-reacted calcium salt particles from the aqueous suspension obtained in step d). Thus, a process for producing surface-reacted calcium salt particles may comprise the following steps:

a) providing a calcium salt excluding monocalcium phosphate and dicalcium phosphate, b) providing a calcium phosphate selected from monocalcium phosphate and/or dicalcium phosphate, c) forming an aqueous suspension by mixing the calcium salt of step a), and the calcium phosphate of step b) with water, and d) grinding the aqueous suspension of step c) at a pH value of at least 4.2 to form an aqueous suspension of surface-reacted calcium salt particles, wherein the calcium salt of step a) and the calcium phosphate of step b) in combination have a calcium ion to phosphate ion molar ratio ($Ca^{2+}:PO_4^{3+}$) in the range from 1.75:1 to 100:1, and e) separating the surface-reacted calcium salt particles from the aqueous suspension obtained in step d).

According to another embodiment of the present invention, the in-situ process comprising steps I) to IV) defined above further comprises a step V) of separating the surface-reacted calcium salt particles from the aqueous suspension obtained in step IV). Thus, the in-situ process for producing an aqueous suspension of surface-reacted calcium salt particles may comprise the steps of:

I) providing a calcium ion source excluding dicalcium phosphate,

II) providing a phosphate ion source selected from phosphoric acid, a dihydrogen salt thereof, or a mixture thereof, and III) forming an aqueous suspension by mixing the calcium ion source of step I) and the phosphate ion source of step II) in the presence of water to form dicalcium phosphate, IV) grinding the aqueous suspension of step III) at a pH value of at least 4.2 to form an aqueous suspension of surface-reacted calcium carbonate particles, wherein the calcium ion source of step I) and the phosphate ion source of step II) in combination are provided in a calcium ion to phosphate ion molar ratio ($Ca^{2+}$: $PO_4^{3-}$) in the range from 1.75:1 to 100:1, and V) separating the surface-reacted calcium salt particles from the aqueous suspension obtained in step IV).

The surface-reacted calcium salt particles obtained from step d) or IV) may be separated from the aqueous suspension by any conventional means of separation known to the skilled person. According to one embodiment of the present invention, in process step e) the surface-reacted calcium salt particles are separated mechanically and/or thermally. Examples of mechanical separation processes are filtration, e.g. by means of a drum filter or filter press, nanofiltration, or centrifugation. An example for a thermal separation process is a concentrating process by the application of heat, for example, in an evaporator. According to a preferred embodiment, in process step e) the surface-reacted calcium salt particles are separated mechanically, preferably by filtration and/or centrifugation.

After separation or alternatively, the surface-reacted calcium salt particles can be dried in order to obtain dried surface-reacted calcium salt particles. According to one embodiment, the process further comprises a step f) of drying the surface-reacted calcium salt particles after step d) or after step e), if present, at a temperature in the range from 60 to 600° C., preferably until the moisture content of the surface-reacted calcium salt particles is between 0.01 and 5 wt.-%, based on the total weight of the dried surface-reacted calcium salt particles. According to another embodiment, the in-situ process further comprises a step VI) of drying the surface-reacted calcium salt particles after step IV) or after step V), if present, at a temperature in the range from 60 to 600° C., preferably until the moisture content of the surface-reacted calcium salt particles is between 0.01 and 5 wt.-%, based on the total weight of the dried surface-reacted calcium salt particles.

According to one embodiment of the present invention, a process for producing dried surface-reacted calcium salt particles is provided comprising the following steps:
 a) providing a calcium salt excluding monocalcium phosphate and dicalcium phosphate,
 b) providing a calcium phosphate selected from monocalcium phosphate and/or dicalcium phosphate,
 c) forming an aqueous suspension by mixing the calcium salt of step a), and the calcium phosphate of step b) with water, and
 d) grinding the aqueous suspension of step c) at a pH value of at least 4.2 to form an aqueous suspension of surface-reacted calcium salt particles,
 wherein the calcium salt of step a) and the calcium phosphate of step b) in combination have a calcium ion to phosphate ion molar ratio ($Ca^{2+}:PO_4^{3+}$) in the range from 1.75:1 to 100:1, and
 e) separating the surface-reacted calcium salt particles from the aqueous suspension obtained in step d), and/or
 f) drying the surface-reacted calcium salt particles.

According to another embodiment, the in-situ process for producing an aqueous suspension of surface-reacted calcium salt particles comprises the steps of:
 I) providing a calcium ion source excluding dicalcium phosphate,
 II) providing a phosphate ion source selected from phosphoric acid, a dihydrogen salt thereof, or a mixture thereof, and
 III) forming an aqueous suspension by mixing the calcium ion source of step I) and the phosphate ion source of step II) in the presence of water to form dicalcium phosphate,
 IV) grinding the aqueous suspension of step III) at a pH value of at least 4.2 to form an aqueous suspension of surface-reacted calcium carbonate particles,
 wherein the calcium ion source of step I) and the phosphate ion source of step II) in combination are provided in a calcium ion to phosphate ion molar ratio ($Ca^{2+}:PO_4^{3-}$) in the range from 1.75:1 to 100:1,
 V) separating the surface-reacted calcium salt particles from the aqueous suspension obtained in step IV), and/or
 VI) drying the surface-reacted calcium salt particles.

In general, the drying step f) or VI) may take place using any suitable drying equipment and can, for example, include thermal drying and/or drying at reduced pressure using equipment such as an evaporator, a flash drier, an oven, a spray drier and/or drying in a vacuum chamber. The drying step f) or VI) can be carried out at reduced pressure, ambient pressure or under increased pressure. For temperatures below 100° C. it may be preferred to carry out the drying step under reduced pressure.

According to one preferred embodiment, the separation is carried out by a thermal method. This may allow to dry the surface-reacted calcium salt particles subsequently without changing the equipment.

According to one embodiment, in process step f) or VI) the surface-reacted calcium salt particles are dried until the moisture content of the formed surface-reacted calcium salt particles is less than or equal to 1.0 wt.-%, based on the total weight of the dried surface-reacted calcium salt particles, preferably less than or equal to 0.5 wt.-%, and more preferably less than or equal to 0.2 wt.-%. According to another embodiment, in process step f) or VI) the surface-reacted calcium salt particles are dried until the moisture content of the formed surface-reacted calcium salt particles is between 0.01 and 0.15 wt.-%, preferably between 0.02 and 0.10 wt.-%, and more preferably between 0.03 and 0.07 wt.-%, based on the total weight of the dried surface-reacted calcium salt particles.

In one embodiment of the present invention, the process further comprises a step g) of treating the surface-reacted calcium salt particles obtained in step d), e) or f) with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, to obtain surface-reacted calcium salt particles comprising on at least a part of the accessible surface area a treatment layer comprising the hydrophobizing agent.

It is to be noted that step g) is independent from steps e) and/or f).

The hydrophobizing agent used in treatment step g) may be any agent known to the skilled person which is capable to form a hydrophobic treatment layer on at least a part of the accessible surface area of the surface-reacted calcium salt particles.

The process step g) of treating the surface-reacted calcium salt particles obtained in step d), e) or f) with at least one mono-substituted succinic anhydride and/or with at least one phosphoric acid ester blend and suitable compounds for coating are described in EP 2 722 368 A1 and EP 2 770 017 A1, which are thus incorporated herewith by references.

Suitable aliphatic carboxylic acids for treating the surface-reacted calcium salt particles obtained in step d), e) or f) are for example aliphatic linear or branched carboxylic acids having between 4 and 24 carbon atoms and are described in EP 3 042 878 A1.

The Surface-Reacted Calcium Salt Particles

According to a further aspect of the present invention, surface-reacted calcium salt particles are provided, wherein the surface-reacted calcium salt particles are obtainable by a process of the present invention. Thus, the surface-reacted calcium salt particles are obtained by a process comprising the steps of:
 a) providing a calcium salt excluding monocalcium phosphate and dicalcium phosphate,
 b) providing a calcium phosphate selected from monocalcium phosphate and/or dicalcium phosphate,
 c) forming an aqueous suspension by mixing the calcium salt of step a), and the calcium phosphate of step b) with water, and
 d) grinding the aqueous suspension of step c) at a pH value of at least 4.2 to form an aqueous suspension of surface-reacted calcium salt particles, wherein the calcium salt of step a) and the calcium phosphate of step b) in combination have a calcium ion to phosphate ion molar ratio ($Ca^{2+}:PO_4^{3+}$) in the range from 1.75:1 to 100:1.

According to another embodiment of the present invention, the surface-reacted calcium salt particles are obtained by an in-situ process comprising the steps of:

I) providing a calcium ion source excluding dicalcium phosphate,

II) providing a phosphate ion source selected from phosphoric acid, a dihydrogen salt thereof, or a mixture thereof, and III) forming an aqueous suspension by mixing the calcium ion source of step I) and the phosphate ion source of step II) in the presence of water to form dicalcium phosphate, and IV) grinding the aqueous suspension of step III) at a pH value of at least 4.2 to form an aqueous suspension of surface-reacted calcium carbonate particles, wherein the calcium ion source of step I) and the phosphate ion source of step II) in combination are provided in a calcium ion to phosphate ion molar ratio ($Ca^{2+}:PO_4^{3-}$) in the range from 1.75:1 to 100:1.

According to one embodiment the surface-reacted calcium salt particles have a specific surface area of from 5 $m^2/g$ to 200 $m^2/g$, preferably from 10 $m^2/g$ to 180 $m^2/g$, more preferably from 20 $m^2/g$ to 170 $m^2/g$, even more preferably from 25 $m^2/g$ to 150 $m^2/g$, and most preferably from 30 $m^2/g$ to 100 $m^2/g$, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in $m^2/g$.

According to one embodiment, surface-reacted calcium salt particles are provided, wherein the surface-reacted calcium salt particles comprise a calcium carbonate-comprising material, and at least one water-insoluble calcium salt other than calcium carbonate, for example, tricalcium phosphate and/or apatitic calcium phosphate, preferably hydroxylapatite, octacalcium phosphate, fluroroapatite, carboxyapatite, or mixtures thereof. The surface-reacted calcium salt particles may comprise a mass ratio of calcium carbonate to tricalcium phosphate and/or apatitic calcium phosphate is in the range from 0.05:1 to 59:1, preferably from 0.14:1 to 44:1, more preferably from 0.2:1 to 29:1, even more preferably from 0.3:1 to 15:1, and most preferably from 0.5:1 to 5:1.

According to one embodiment of the present invention, the surface-reacted calcium salt particles have a specific surface area (BET) of from 5 $m^2/g$ to 200 $m^2/g$, preferably from 10 $m^2/g$ to 180 $m^2/g$, more preferably from 20 $m^2/g$ to 170 $m^2/g$, even more preferably from 25 $m^2/g$ to 150 $m^2/g$, and most preferably from 30 $m^2/g$ to 100 $m^2/g$, measured using nitrogen and the BET method, and the surface-reacted calcium salt particles comprise a mass ratio of calcium carbonate to apatitic calcium phosphate, preferably hydroxylapatite, octacalcium phosphate, fluroroapatite, carboxyapatite, or mixtures thereof, more preferably hydroxylapatite, in the range from 0.05:1 to 59:1, preferably from 0.14:1 to 44:1, more preferably from 0.2:1 to 29:1, even more preferably from 0.3:1 to 15:1, and most preferably from 0.5:1 to 5:1.

According to one embodiment, the surface-reacted calcium salt particles have a volume determined median particle size $d_{50}$(vol) from 0.5 to 75 µm, preferably from 1 to 50 µm, more preferably from 2 to 40 µm, even more preferably from 2.5 to 30 µm, and most preferably from 3 to 15 µm, and/or a volume determined top cut particle size $d_{98}$(vol) from 1 to 150 µm, preferably from 2 to 100 µm, more preferably from 4 to 80 µm, even more preferably from 5 to 60 µm, and most preferably from 6 to 30 µm.

According to one embodiment, the surface-reacted calcium salt particles have been treated with at least one hydrophobizing agent. Therefore, the surface-reacted calcium salt particles comprise on at least a part of the accessible surface area a treatment layer comprising a hydrophobizing agent and preferably the surface-reacted calcium salt particles comprise on at least a part of the accessible surface area a treatment layer comprising an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, and reaction products thereof. The term "reaction products" of an aliphatic carboxylic acid having a total amount of carbon atoms from C4 to C24 and/or of a mono-substituted succinic anhydride consisting of succinic anhydride mono-substituted with a group selected from a linear, branched, aliphatic and cyclic group having a total amount of carbon atoms from C2 to C30 in the substituent and/or of a phosphoric acid ester blend of one or more phosphoric acid mono-ester and one or more phosphoric di-ester in the meaning of the present invention refers to products obtained by contacting the surface-reacted calcium salt particles with such hydrophobizing agents.

The surface-reacted calcium salt particles obtainable by a process of the present invention can be provided in form of a suspension of surface-reacted calcium salt particles, as separated surface-reacted calcium salt particles, or as dried surface-reacted calcium salt particles. According to a preferred embodiment the surface-reacted calcium salt particles are dried surface-reacted calcium salt particles.

In case the surface-reacted calcium salt particles have been dried, the moisture content of the dried surface-reacted calcium salt particles can be between 0.01 and 5 wt.-%, based on the total weight of the dried surface-reacted calcium salt particles. According to one embodiment, the moisture content of the dried surface-reacted calcium salt particles is less than or equal to 1.0 wt.-%, based on the total weight of the dried surface-reacted calcium salt particles, preferably less than or equal to 0.5 wt.-%, and more preferably less than or equal to 0.2 wt.-%. According to another embodiment, the moisture content of the dried surface-reacted calcium salt particles is between 0.01 and 0.15 wt.-%, preferably between 0.02 and 0.10 wt.-%, and more preferably between 0.03 and 0.07 wt.-%, based on the total weight of the dried surface-reacted calcium salt particles.

The inventive surface-reacted calcium salt particles may also be provided and/or used in form of a composition. According to one aspect of the present invention, a composition is provided comprising surface-reacted calcium salt particles according to present invention, and additional filler materials, preferably natural ground calcium carbonate, precipitated calcium carbonate, dolomite, or mixtures thereof. The composition may comprise the surface-reacted calcium salt particles according to present invention in an amount of at least 10 wt.-%, based on the total weight of the composition, preferably at least 20 wt.-%, more preferably at least 30 wt.-%, and most preferably at least 40 wt.-%.

The surface-reacted calcium salt particles may be used for various applications.

According to one embodiment, the surface-reacted calcium salt particles according to the present invention are used in polymer applications, paper coating applications, paper making, paints, coatings, sealants, printing inks, adhesives, food, feed, pharmaceuticals, concrete, cement, cosmetics, water treatment, engineered wood applications, plasterboard applications, packaging applications, or agricultural applications. Preferably the surface-reacted calcium salt particles may be used as a dried surface-reacted calcium carbonate.

The surface-reacted calcium salt particles also may be incorporated into an article. According to a further aspect of the present invention, an article is provided comprising the surface-reacted calcium salt particles according to the present invention, wherein the article is selected from paper products, engineered wood products, plasterboard products, polymer products, hygiene products, medical products, healthcare products, filter products, woven materials, non-woven materials, geotextile products, agriculture products, horticulture products, clothing, footwear products, baggage products, household products, industrial products, packaging products, building products, or construction products.

The scope and interest of the invention will be better understood based on the following examples which are intended to illustrate certain embodiments of the present invention and are non-limitative.

EXAMPLES

1. Measurement Methods

In the following, measurement methods implemented in the examples are described.

1.1 Particle Size Distribution

Volume determined median particle size $d_{50}(vol)$ and the volume determined top cut particle size $d_{98}(vol)$ was evaluated using a Malvern Mastersizer 2000 Laser Diffraction System (Malvern Instruments Plc., Great Britain). The $d_{50}$ (vol) or $d_{98}(vol)$ value indicates a diameter value such that 50% or 98% by volume, respectively, of the particles have a diameter of less than this value. The raw data obtained by the measurement was analyzed using the Mie theory, with a particle refractive index of 1.57 and an absorption index of 0.005. The methods and instruments are known to the skilled person and are commonly used to determine particle size distributions of fillers and pigments. The sample was measured in dry condition without any prior treatment.

The weight determined median particle size $d_{50}(wt)$ and the weight determined top cut particle size $d_{98}(wt)$ was measured by the sedimentation method, which is an analysis of sedimentation behaviour in a gravimetric field. The measurement was made with a Sedigraph™ 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high speed stirrer and supersonicated.

1.2. Specific Surface Area (SSA)

The specific surface area was measured via the BET method according to ISO 9277:2010 using nitrogen and a ASAP 2460 instrument (Micromeritics GmbH, Germany), following conditioning of the sample by heating at 100° C. for a period of 30 minutes. Prior to such measurements, the sample was filtered within a Büchner funnel, rinsed with deionised water and dried at 110° C. in an oven for at least 12 hours.

1.3. Specific Grinding Energy (SGE)

The specific grinding energy (SGE) was determined through first recording simultaneously the electrical power consumption (P) of the grinding device, given in kW, and the volumetric flow rate $(v_s)$ of the feeding slurry, given in m³/h, and as indicated in the respective monitoring displays. Further, the total solids (TS) content of the feeding slurry, given in wt.-% was determined using a Moisture Analyzer HR73 from Mettler-Toledo (T=120° C., automatic switch off 3, standard drying) with a sample size of 5 to 20 g. Assuming the density of water $(\rho_w)$ to be 1.00 T/m³ and the density of the applied dry calcium carbonate/marble/chalk (pc) to be 2.71 T/m³, the SGE can be calculated as the function of the given quantities, as expressed in equations (1), (2) and (3).

$$SGE = P/((TS) \cdot m_s) \qquad \text{Eq. (1)}$$

$$m_s = \rho_s \cdot v_s \qquad \text{Eq. (2)}$$

$$\rho_s = [\rho_c \cdot \rho_w]/[\rho_c \cdot (1-(TS)) + \rho_w \cdot (TS)] \qquad \text{Eq. (3)}$$

2. Examples 2.1. Example 1 (In-Situ Production of Dicalcium Phosphate)

Ground marble, from Omya SPA Carrara Italy having a weight determined median particle size $d_{50}(wt)$ of 10 μm and a weight determined top cut particle size $d_{98}(wt)$ of 50 μm was diluted with water at ambient temperature (20° C.±2° C.) in a high-speed tank mixer such that the aqueous suspension obtained has a solids content corresponding to 20% by dry weight relative to the total suspension weight.

Under stirring such that essentially laminar flow is established, an aqueous solution having 75 wt.-% of $H_3PO_4$, based on the total weight of the aqueous solution, was added to the calcium carbonate over the period of 90 to 120 seconds in an amount corresponding to 10% by weight active phosphoric acid on dry calcium carbonate weight. Following this addition, $CO_2$ gas bubbles were observed to form and pass upwards through the suspension.

Mixing in the high-speed tank mixer was continued until no gas bubbles were observed and the pH of the slurry was at least 7.0. Subsequently, the slurry was transferred to a storage tank equipped with a slow mixing device to keep the solid particulate material suspended. The slurry was then pumped at a rate of 75 L/h through a 25 L vertical bead mill filled with 21 kg of $ZrO_2$ based grinding medium having a bead material density of 3.8 g/cm³ and run at a mill-rotor tip speed of 5.3 m/s resulting into a specific grinding energy (SGE) of 189 kWh/T. The product was collected after at least 25 L of slurry was pumped through the mill.

The obtained surface-reacted calcium salt particles presented a specific surface area (SSA) of 50 m²/g, a volume determined median particle size $d_{50}(vol)$ of 4.2 μm, and a volume determined top cut particle size $d_{98}(vol)$ of 10.5 μm.

2.2. Example 2 (In-Situ Production of Dicalcium Phosphate)

Ground marble, from Omya SPA Carrara Italy having a weight determined median particle size $d_{50}(wt)$ of 10 μm and a weight determined top cut particle size $d_{98}(wt)$ of 50 µm was diluted with water at ambient temperature (20° C.±2° C.) in a high-speed tank mixer such that the aqueous suspension obtained has a solids content corresponding to 20% by dry weight relative to the total suspension weight.

Under stirring such that essentially laminar flow is established, an aqueous solution having 75 wt.-% of $H_3PO_4$, based on the total weight of the aqueous solution, was added to the calcium carbonate over the period of 90 to 120 seconds in an amount corresponding to 15% by weight active phosphoric acid on dry calcium carbonate weight. Following this addition, $CO_2$ gas bubbles were observed to form and pass upwards through the suspension.

Mixing in the high-speed tank mixer was continued until no gas bubbles were observed and the pH of the slurry was at least 7.0. Subsequently, the slurry was transferred to a storage tank equipped with a slow mixing device to keep the solid particulate material suspended. The slurry was then pumped at a rate of 75 L/h through a 25 L vertical bead mill filled with 21 kg of $ZrO_2$ based grinding medium having a bead material density of 3.8 g/cm³ and run at a mill-rotor tip speed of 7.5 m/s resulting into a specific grinding energy (SGE) of 260 kWh/T. The product was collected after at least 25 L of slurry was pumped through the mill.

The obtained surface-reacted calcium salt particles presented a specific surface area (SSA) of 62 m²/g, a volume determined median particle size $d_{50}(vol)$ of 3.3 µm, and a volume determined top cut particle size $d_{98}(vol)$ of 7.2 µm.

2.3. Example 3 (In-Situ Production of Dicalcium Phosphate)

Ground marble, from Omya SPA Carrara Italy having a weight determined median particle size $d_{50}(wt)$ of 10 µm and a weight determined top cut particle size $d_{98}(wt)$ of 50 µm was diluted with water at ambient temperature (20° C.±2° C.) in a high-speed tank mixer such that the aqueous suspension obtained has a solids content corresponding to 20% by dry weight relative to the total suspension weight.

Under stirring such that essentially laminar flow is established, an aqueous solution having 75 wt.-% of $H_3PO_4$, based on the total weight of the aqueous solution, was added to the calcium carbonate over the period of 90 to 120 seconds in an amount corresponding to 10% by weight active phosphoric acid on dry calcium carbonate weight. Following this addition, $CO_2$ gas bubbles were observed to form and pass upwards through the suspension.

Mixing in the high-speed tank mixer was continued until no gas bubbles were observed and the pH of the slurry was at least 7.0. Subsequently, the slurry was transferred to a storage tank equipped with a slow mixing device to keep the solid particulate material suspended. The slurry was then pumped at a rate of 75 L/h through a 25 L vertical bead mill filled with 36 kg of $ZrO_2$ based grinding medium having a bead material density of 6.2 g/cm³ and run at a mill-rotor tip speed of 5.3 m/s resulting into a specific grinding energy (SGE) of 290 kWh/T. The product was collected after at least 25 L of slurry was pumped through the mill.

The obtained surface-reacted calcium salt particles presented a specific surface area (SSA) of 48 m²/g, a volume determined median particle size $d_{50}(vol)$ of 2.9 µm, and a volume determined top cut particle size $d_{98}(vol)$ of 7.0 µm.

2.4. Example 4 (in-situ production of dicalcium phosphate)

Fine chalk powder (Aero chalk), from Omya SAS Omey France having a weight determined median particle size $d_{50}(wt)$ of 4 µm and a weight determined top cut particle size $d_{98}(wt)$ of 16 µm was diluted with water at ambient temperature (20° C.±2° C.) in a high-speed tank mixer such that the aqueous suspension obtained has a solids content corresponding to 20% by dry weight relative to the total suspension weight.

Under stirring such that essentially laminar flow is established, an aqueous solution having 75 wt.-% of $H_3PO_4$, based on the total weight of the aqueous solution, was added to the calcium carbonate over the period of 90 to 120 seconds in an amount corresponding to 10% by weight active phosphoric acid on dry calcium carbonate weight. Following this addition, $CO_2$ gas bubbles were observed to form and pass upwards through the suspension.

Mixing in the high-speed tank mixer was continued until no gas bubbles were observed and the pH of the slurry was at least 7.0. Subsequently, the slurry was transferred to a storage tank equipped with a slow mixing device to keep the solid particulate material suspended. The slurry was then pumped at a rate of 75 L/h through a 25 L vertical bead mill filled with 21 kg of $ZrO_2$ based grinding medium having a bead material density of 3.8 g/cm³ and run at a mill-rotor tip speed of 5.3 m/s resulting into a specific grinding energy (SGE) of 233 kWh/T. The product was collected after at least 25 L of slurry was pumped through the mill.

The obtained surface-reacted calcium salt particles presented a specific surface area (SSA) of 47 m²/g, a volume determined median particle size $d_{50}(vol)$ of 3.6 µm, and a volume determined top cut particle size $d_{98}(vol)$ of 8.5 µm.

2.5. Example 5 (In-Situ Production of Dicalcium Phosphate)

Ground marble, from Omya SPA Carrara Italy having a weight determined median particle size $d_{50}(wt)$ of 10 µm and a weight determined top cut particle size $d_{98}(wt)$ of 50 µm was diluted with water at ambient temperature (20° C.±2° C.) in a high-speed tank mixer such that the aqueous suspension obtained has a solids content corresponding to 20% by dry weight relative to the total suspension weight.

Under stirring such that essentially laminar flow is established, an aqueous solution having 75 wt.-% of $H_3PO_4$, based on the total weight of the aqueous solution, was added to the calcium carbonate over the period of 90 to 120 seconds in an amount corresponding to 10% by weight active phosphoric acid on dry calcium carbonate weight. Following this addition, $CO_2$ gas bubbles were observed to form and pass upwards through the suspension.

Mixing in the high-speed tank mixer was continued until no gas bubbles were observed and the pH of the slurry was at least 7.0. Subsequently, the slurry was transferred to a storage tank equipped with a slow mixing device to keep the solid particulate material suspended. The slurry was then pumped at a rate of 15.8 L/h through a 6 L vertical bead mill filled with 10 kg of $ZrO_2$ based grinding medium having a bead material density of 3.8 g/cm³ and run at a mill-rotor tip speed of 5.0 m/s resulting into a specific grinding energy (SGE) of 254 kWh/T. The product was collected after a temporally constant temperature platform (max.±2° C. fluctuation range at steady state) was reached.

The obtained surface-reacted calcium salt particles presented a specific surface area (SSA) of 50 m²/g, a volume determined median particle size $d_{50}(vol)$ of 3.3 µm, and a volume determined top cut particle size $d_{98}(vol)$ of 7.8 µm.

2.6. Example 6 (Separate Production of Dicalcium Phosphate)

Batch 1

Ground marble, from Omya SPA Carrara Italy having a weight determined median particle size $d_{50}(wt)$ of 10 µm and a weight determined top cut particle size $d_{98}(wt)$ of 50 µm was diluted with water at ambient temperature (20° C.±2° C.) in a high-speed tank mixer such that the aqueous suspension obtained has a solids content corresponding to 40% by dry weight relative to the total suspension weight.

Under essentially turbulent stirring, an aqueous solution having 75 wt.-% of $H_3PO_4$, based on the total weight of the aqueous solution, was added to the calcium carbonate over the period of 90 to 120 seconds in an amount corresponding to 98% by weight active phosphoric acid on dry calcium carbonate weight. Following this addition, $CO_2$ gas bubbles were observed to form and pass upwards through the suspension. Mixing in the high-speed tank mixer was continued until no gas bubbles were observed.

Batch 2

Ground marble, from Omya SPA Carrara Italy having a weight determined median particle size $d_{50}(wt)$ of 10 µm and a weight determined top cut particle size $d_{98}(wt)$ of 50 µm was diluted with water at ambient temperature (20° C.±2° C.) in a second high-speed tank mixer such that the aqueous suspension obtained has a solids content corresponding to 19% by dry weight relative to the total suspension weight.

Mixing and Grinding

Under stirring such that essentially laminar flow is established, Batch 1 was added into Batch 2 such that the total added marble in the combined slurry corresponds to 20% by dry weight relative to the total suspension weight, excluding the weight of added aqueous solution of $H_3PO_4$.

Subsequently, the slurry was transferred to a storage tank equipped with a slow mixing device to keep the solid particulate material suspended. The slurry was then pumped at a rate of 75 L/h through a 25 L vertical bead mill filled with 21 kg of a $ZrO_2$ based grinding medium having a bead material density of 3.8 g/cm³ and run at a mill-rotor tip speed of 5.3 m/s resulting into a specific grinding energy (SGE) of 211 kWh/T. Product was collected after at least 25 L of slurry was pumped through the mill.

The obtained surface-reacted calcium salt particles presented a specific surface area (SSA) of 54 m²/g, a volume determined median particle size $d_{50}(vol)$ of 4.0 µm, and a volume determined top cut particle size $d_{98}(vol)$ of 9.2 µm.

2.7. Example 7 (Separate Production of Dicalcium Phosphate)

Batch 1

Fine chalk powder (Aero chalk), from Omya SAS Omey France having a weight determined median particle size $d_{50}(wt)$ of 4 µm and a weight determined top cut particle size $d_{98}(wt)$ of 16 µm was diluted with water at ambient temperature (20° C.±2° C.) in a high-speed tank mixer such that the aqueous suspension obtained has a solids content corresponding to 40% by dry weight relative to the total suspension weight.

Under essentially turbulent stirring, an aqueous solution having 75 wt.-% of $H_3PO_4$, based on the total weight of the aqueous solution, was added to the calcium carbonate over the period of 90 to 120 seconds in an amount corresponding to 98% by weight active phosphoric acid on dry calcium carbonate weight. Following this addition, $CO_2$ gas bubbles were observed to form and pass upwards through the suspension. Mixing in the high-speed tank mixer was continued until no gas bubbles were observed.

Batch 2

Fine chalk powder (Aero chalk), from Omya SAS Omey France having a weight determined median particle size $d_{50}(wt)$ of 4 µm and a weight determined top cut particle size $d_{98}(wt)$ of 16 µm was diluted with water at ambient temperature in a second high-speed tank mixer such that the aqueous suspension obtained has a solids content corresponding to 19% by dry weight relative to the total suspension weight.

Mixing and Grinding

Under stirring such that essentially laminar flow is established, Batch 1 was added into Batch 2 such that the total added chalk in the combined slurry corresponds to 20% by dry weight relative to the total suspension weight excluding the weight of added aqueous solution of $H_3PO_4$.

Subsequently, the slurry was transferred to a storage tank equipped with a slow mixing device to keep the solid particulate material suspended. The slurry was then pumped at a rate of 75 L/h through a 25 L vertical bead mill filled with 21 kg of $ZrO_2$ based grinding medium having a bead material density of 3.8 g/cm³ and run at a mill-rotor tip speed of 5.3 m/s resulting into a specific grinding energy (SGE) of 204 kWh/T. Product was collected after at least 25 L of slurry was pumped through the mill.

The obtained surface-reacted calcium salt particles presented a specific surface area (SSA) of 42 m²/g, a volume determined median particle size $d_{50}(vol)$ of 4.0 µm, and a volume determined top cut particle size $d_{98}(vol)$ of 9.6 µm.

The described process parameters of Examples 1 to 7, together with the respective SSA, $d_{50}(vol)$ and $d_{98}(vol)$ values of the obtained products are summarized in Table 1 below.

2.8. Example 8 (Monohydrogen Salt as Phosphate Ion Source)

Ground marble, from Omya SPA Carrara Italy having a weight determined median particle size $d_{50}(wt)$ of 10 µm, a weight determined top cut particle size $d_{98}(wt)$ of 50 µm, and a specific surface area (SSA) of 1.1 m²/g, was diluted with water at ambient temperature (20° C.±2° C.) in a 15 L bucket with an overhead stirrer such that the aqueous suspension obtained has a solids content corresponding to 40% by dry weight relative to the total suspension weight.

Under stirring such that essentially laminar flow is established, an aqueous mixture having 6.8 wt.-% of $Na_2HPO_4·2H_2O$, based on the total weight of the aqueous mixture, was added to the calcium carbonate suspension over the period of 45 to 60 seconds in an amount corresponding to 18.2% by weight $Na_2HPO_4·2H_2O$ salt on dry calcium carbonate weight such that the aqueous suspension obtained has a solids content corresponding to 20% by dry calcium carbonate weight relative to the total suspension weight.

Mixing in the bucket with an overhead stirrer was continued at least 10 min. The slurry was then pumped at a rate of 17.7 L/h through a 0.6 L horizontal bead mill filled with 1.070 kg of $ZrO_2$ based grinding medium having a bead material density of 6.2 g/cm³ and run at a mill-agitator tip speed of 14 m/s. The product was collected after at least 5 L of slurry was pumped through the mill.

The obtained surface-reacted calcium salt particles presented SSA of 20.6 m²/g, a volume determined median particle size $d_{50}(vol)$ of 7.9 µm, and a volume determined top cut particle size $d_{98}(vol)$ of 19.2 µm.

2.9. Example 9 (Dihydrogen Salt as Phosphate Ion Source)

Ground marble, from Omya SPA Carrara Italy having a weight determined median particle size $d_{50}(wt)$ of 10 µm, a weight determined top cut particle size $d_{98}(wt)$ of 50 μm, and a specific surface area (SSA) of 1.1 m²/g, was diluted with water at ambient temperature (20° C.±2° C.) in a 15 L bucket with an overhead stirrer such that the aqueous suspension obtained has a solids content corresponding to 40% by dry weight relative to the total suspension weight.

Under stirring such that essentially laminar flow is established, an aqueous mixture having 6.0 wt.-% of $NaH_2PO_4.2H_2O$, based on the total weight of the aqueous mixture, was added to the calcium carbonate suspension over the period of 45 to 60 seconds in an amount corresponding to 15.9% by weight $NaH_2PO_4.2H_2O$ salt on dry calcium carbonate weight such that the aqueous suspension obtained has a solids content corresponding to 20% by dry calcium carbonate weight relative to the total suspension weight.

Mixing in the bucket with an overhead stirrer was continued at least 10 min. The slurry was then pumped at a rate of 18.1 L/h through a 0.6 L horizontal bead mill filled with 1.070 kg of $ZrO_2$ based grinding medium having a bead material density of 6.2 g/cm³ and run at a mill-agitator tip speed of 14 m/s. The product was collected after at least 5 L of slurry was pumped through the mill.

The obtained surface-reacted calcium salt particles presented SSA of 34.1 m²/g, a volume determined median particle size $d_{50}(vol)$ of 9.4 μm, and a volume determined top cut particle size $d_{98}(vol)$ of 22.8 μm.

2.10. Example 10 (Dihydrogen Salt as Phosphate Ion Source)

Ground marble, from Omya SPA Carrara Italy having a weight determined median particle size $d_{50}(wt)$ of 10 μm, a weight determined top cut particle size $d_{98}(wt)$ of 50 μm, and a specific surface area (SSA) of 1.1 m²/g, was diluted with water at ambient temperature (20° C.±2° C.) in a 15 L bucket with an overhead stirrer such that the aqueous suspension obtained has a solids content corresponding to 40% by dry weight relative to the total suspension weight.

Under stirring such that essentially laminar flow is established, an aqueous mixture having 4.9 wt.-% of $Ca(H_2PO_4)_2 \cdot H_2O$, based on the total weight of the aqueous mixture, was added to the calcium carbonate suspension over the period of 45 to 60 seconds in an amount corresponding to 12.9% by weight $Ca(H_2PO_4)_2.H_2O$ salt on dry calcium carbonate weight such that the aqueous suspension obtained has a solids content corresponding to 20% by dry calcium carbonate weight relative to the total suspension weight.

Mixing in the bucket with an overhead stirrer was continued at least 10 min. The slurry was then pumped at a rate of 18.6 L/h through a 0.6 L horizontal bead mill filled with 1.070 kg of $ZrO_2$ based grinding medium having a bead material density of 6.2 g/cm³ and run at a mill-agitator speed of 14 m/s. The product was collected after at least 5 L of slurry was pumped through the mill.

The obtained surface-reacted calcium salt particles presented SSA of 46.9 m²/g, a volume determined median particle size $d_{50}(vol)$ of 8.0 μm, and a volume determined top cut particle size $d_{98}(vol)$ of 20.2 μm.

2.11. Example 11 (Dihydrogen Salt as Phosphate Ion Source)

Ground marble, from Omya SPA Carrara Italy having a weight determined median particle size $d_{50}(wt)$ of 10 μm, a weight determined top cut particle size $d_{98}(wt)$ of 50 μm, and a specific surface area (SSA) of 1.1 m²/g, was diluted with water at ambient temperature (20° C.±2° C.) in a 15 L bucket with an overhead stirrer such that the aqueous suspension obtained has a solids content corresponding to 40% by dry weight relative to the total suspension weight.

Under stirring such that essentially laminar flow is established, solid $KH_2PO_4$ crystals, were added to the calcium carbonate suspension over the period of 15 to 25 seconds in an amount corresponding to 13.9% by weight $KH_2PO_4$ salt on dry calcium carbonate weight such that the aqueous suspension obtained has a solids content corresponding to 20% by dry calcium carbonate weight relative to the total suspension weight.

Mixing in the bucket with an overhead stirrer was continued at least 10 min. The slurry was then pumped at a rate of 20.1 L/h through a 0.6 L horizontal bead mill filled with 1.070 kg of $ZrO_2$ based grinding medium having a bead material density of 6.2 g/cm³ and run at a mill-agitator speed of 14 m/s. The product was collected after at least 5 L of slurry was pumped through the mill.

The obtained surface-reacted calcium salt particles presented SSA of 27.1 m²/g, a volume determined median particle size $d_{50}(vol)$ of 8.1 μm, and a volume determined top cut particle size $d_{98}(vol)$ of 19.7 μm.

2.12. Example 12 (Lime Stone as Calcium Ion Source)

Ground lime stone, from Omya SAS Orgon France having a weight determined median particle size $d_{50}(wt)$ of 3.5 μm, a weight determined top cut particle size $d_{98}(wt)$ of 10.5 μm, and a specific surface area (SSA) of 1.5 m²/g, was diluted with water at ambient temperature (20° C.±2° C.) in a 15 L bucket with an overhead stirrer such that the aqueous suspension obtained has a solids content corresponding to 20% by dry weight relative to the total suspension weight.

Under stirring such that essentially laminar flow is established, an aqueous mixture having 85 wt.-% of $H_3PO_4$, based on the total weight of the aqueous solution, was added to the calcium carbonate suspension over the period of 25 to 35 seconds in an amount corresponding to 10% by weight active phosphoric acid on dry calcium carbonate weight. Following this addition, $CO_2$ gas bubbles were observed to form and pass upwards through the suspension.

Mixing in the bucket with an overhead stirrer was continued at least 10 min, until no gas bubbles were observed and the pH of the slurry was at least 7.0. The slurry was then pumped at a rate of 20.4 L/h through a 0.6 L horizontal bead mill filled with 1.070 kg of $ZrO_2$ based grinding medium having a bead material density of 6.2 g/cm³ and run at a mill-agitator tip speed of 14 m/s. The product was collected after at least 5 L of slurry was pumped through the mill.

The obtained surface-reacted calcium salt particles presented SSA of 47.1 m²/g, a volume determined median particle size $d_{50}(vol)$ of 8.7 μm, and a volume determined top cut particle size $d_{98}(vol)$ of 25.0 μm, as measured right after the process.

2.13. Example 13 (Scalenohedral Precipitated Calcium Carbonate (S-PCC) as Calcium Ion Source)

A 20% slurry of scalenohedral precipitated calcium carbonate, from Omya GmbH Hausmening Austria having a volume determined median particle size $d_{50}(wt)$ of 3.3 μm and specific surface area (SSA) of 5.5 m²/g was stirred at ambient temperature (20° C.±2° C.) in a 15 L bucket with an overhead stirrer.

Under stirring such that essentially laminar flow is established, an aqueous mixture having 85 wt.-% of $H_3PO_4$, based on the total weight of the aqueous solution, was added to the calcium carbonate suspension over the period of 25 to 35 seconds in an amount corresponding to 10% by weight active phosphoric acid on dry calcium carbonate weight. Following this addition, $CO_2$ gas bubbles were observed to form and pass upwards through the suspension.

Mixing in the bucket with an overhead stirrer was continued at least 10 min, until no gas bubbles were observed and the pH of the slurry was at least 7.0. The slurry was then pumped at a rate of 18.3 L/h through a 0.6 L horizontal bead mill filled with 1.070 kg of $ZrO_2$ based grinding medium having a bead material density of 6.2 g/cm³ and run at a mill-agitator tip speed of 14 m/s. The product was collected after at least 3 L of slurry was pumped through the mill.

The obtained surface-reacted calcium salt particles presented SSA of 36.0 m²/g, a volume determined median particle size $d_{50}$(vol) of 1.95 μm, and a volume determined top cut particle size $d_{98}$(vol) of 15.5 μm, as measured right after the process.

TABLE 1

Process parameters and characteristics of obtained surface-reacted calcium carbonates.

| Example | 1 | 2 | 3 | 4 | 5 | 6 | 7 |
|---|---|---|---|---|---|---|---|
| Calcium salt | Marble | Marble | Marble | Chalk | Marble | Marble | Chalk |
| Calcium phosphate production | in-situ | in-situ | in-situ | in-situ | in-situ | separate | separate |
| Amount calcium salt (wt.-%, based on total weight of aqueous suspension) | 20 | 20 | 20 | 20 | 20 | 40 (batch 1) 19 (batch 2) 20 (mixture) | 40 (batch 1) 19 (batch 2) 20 (mixture) |
| Added $H_3PO_4$ or phosphate salt amount (wt.-%, based on total weight of calcium salt) | 10 | 15 | 10 | 10 | 10 | 98 (batch 1) 10 (mixture) | 98 (batch 1) 10 (mixture) |
| Molar ratio $Ca^{2+}:PO_4^{3-}$ | 9.79:1 | 6.53:1 | 9.79:1 | 9.79:1 | 9.79:1 | 1.0:1 (batch 1) 9.79:1 (mixture) | 1.0:1 (batch 1) 9.79:1 (mixture) |
| Mill volume (L) | 25 | 25 | 25 | 25 | 6 | 25 | 25 |
| Grinding medium | A* | A* | B** | A* | A* | A* | A* |
| Bead diameter | 1.0/1.6 mm | 1.0/1.6 mm | 1.2/1.4 mm | 1.0/1.6 mm | 0.7/1.4 mm | 1.0/1.6 mm | 1.0/1.6 mm |
| Amount | 21 kg | 21 kg | 36 kg | 21 kg | 10 kg | 21 kg | 21 kg |
| Flow rate (L/h) | 75 | 75 | 75 | 75 | 15.8 | 75 | 75 |
| Tip speed (m/s) | 5.3 | 7.5 | 5.3 | 5.3 | 5.0 | 5.3 | 5.3 |
| SGE (kWh/T) | 189 | 260 | 290 | 233 | 254 | 211 | 204 |
| SSA (m²/g) of SRCC | 50 | 62 | 48 | 47 | 50 | 54 | 42 |
| $d_{50}$ (μm) of SRCC | 4.2 | 3.3 | 2.9 | 3.6 | 3.3 | 4.0 | 4.0 |
| $d_{98}$ (μm) of SRCC | 10.5 | 7.2 | 7.0 | 8.5 | 7.8 | 9.2 | 9.6 |

*A: Specific bead density = 3.8 g/cm³; Composition: 66% $ZrO_2$, 1% $HfO_2$, 5% $Al_2O_3$, 27% $SiO_2$, 1% others Origin: France.
**B: Specific bead density = 6.2 g/cm³; Composition: 80% $ZrO_2$, 2% $HfO_2$, 0.4% $Al_2O_3$, <200 ppm $SiO_2$, 16.5% $CeO_2$, 1.1% others; Origin: China

TABLE 2

Process parameters and characteristics of obtained surface-reacted calcium carbonates.

| Example | 8 | 9 | 10 | 11 | 12 | 13 |
|---|---|---|---|---|---|---|
| Calcium salt | Marble | Marble | Marble | Marble | Lime stone | S-PCC |
| Phosphate source | $Na_2HPO_4 \cdot 2H_2O$ | $NaH_2PO_4 \cdot 2H_2O$ | $Ca(H_2PO_4) \cdot H_2O$ | $KH_2PO_4$ | $H_3PO_4$ | $H_3PO_4$ |
| Calcium phosphate production | in-situ | in-situ | separate | in-situ | in-situ | in-situ |
| Amount calcium salt (wt.-%, based on total weight of aqueous suspension) | 20 | 20 | 20 | 20 | 20 | 20 |
| Added $H_3PO_4$ or phosphate salt amount (wt.-%, based on total weight of calcium salt) | 18.2 | 15.9 | 12.9 | 13.9 | 10 | 10 |
| Molar ratio $Ca^{2+}:PO_4^{3-}$ | 9.79:1 | 9.79:1 | 9.79:1 | 9.79:1 | 9.79:1 | 9.79:1 |
| Mill volume (L) | 0.6 | 0.6 | 0.6 | 0.6 | 0.6 | 0.6 |
| Grinding medium | A* | A* | A* | A* | A* | A* |
| Bead diameter | 0.6/1.0 mm | 0.6/1.0 mm | 0.6/1.0 mm | 0.6/1.0 mm | 0.6/1.0 mm | 0.7/1.4 mm |
| Amount | 1.070 kg | 1.070 kg | 1.070 kg | 1.070 kg | 1.070 kg | 1.070 kg |
| Flow rate (L/h) | 17.7 | 18.1 | 18.6 | 20.1 | 20.4 | 18.3 |
| Tip speed (m/s) | 14 | 14 | 14 | 14 | 14 | 14 |

TABLE 2-continued

Process parameters and characteristics of obtained surface-reacted calcium carbonates.

| Example | 8 | 9 | 10 | 11 | 12 | 13 |
|---|---|---|---|---|---|---|
| SSA (m$^2$/g) of SRCC | 20.6 | 34.1 | 46.9 | 27.1 | 47.1 | 36.0 |
| d$_{50}$ (μm) of SRCC | 7.9 | 9.4 | 8 | 8.1 | 8.7 | 1.95 |
| d$_{98}$ (μm) of SRCC | 19.2 | 22.8 | 20.2 | 19.7 | 25 | 15.5 |

*A: Specific bead density = 3.8 g/cm$^3$; Composition: 66% ZrO$_2$, 1% HfO$_2$, 5% Al$_2$O$_3$, 27% SiO$_2$, 1% others; Origin: France.

The invention claimed is:

1. A process for producing an aqueous suspension of surface-reacted calcium salt particles comprising the steps of:
   a) providing a calcium salt excluding monocalcium phosphate and dicalcium phosphate,
   b) providing a calcium phosphate, wherein the calcium phosphate is dicalcium phosphate and is produced by contacting a calcium ion source and a phosphate ion source,
   c) forming an aqueous suspension by mixing the calcium salt of step a), and the calcium phosphate of step b) with water, and
   d) grinding the aqueous suspension of step c) at a pH value from 4.2 to 14 and at a temperature of 0° C. to 100° C. to form an aqueous suspension of surface-reacted calcium salt particles,
   wherein the calcium salt of step a) and the calcium phosphate of step b) in combination have a calcium ion to a phosphate ion molar ratio (Ca$^{2+}$: PO$_4^{3-}$) in the range from 2.2:1 to 100:1;
   wherein grinding of step d) is carried out:
   (1) in a ball mill, a rod mill, a vibrating mill, a centrifugal impact mill, a vertical bead mill, an attrition mill, a sand mill, or combinations thereof; and
   (2) at a specific grinding energy from 50 to 500 kWh per dry metric ton of (2) surface-reacted calcium salt particles.

2. The process of claim 1, wherein the calcium salt of step a) is selected from a calcium carbonate-comprising material, calcium oxide, calcium hydroxide, calcium chloride, calcium nitrate, calcium chlorate, calcium bromide, calcium iodide, calcium acetate, calcium sulphate, calcium citrate, or mixtures thereof.

3. The process of claim 2, wherein the calcium carbonate-comprising material is selected from natural ground calcium carbonate, precipitated calcium carbonate, dolomite, or mixtures thereof.

4. The process of claim 1, wherein the calcium salt of step a) is in form of particles having a weight median particle size d$_{50}$(wt) from 0.05 to 500 μm.

5. The process of claim 1, wherein the calcium salt of step a) and the calcium phosphate of step b) in combination have a calcium ion to phosphate ion molar ratio (Ca$^{2+}$: PO$_4^{3-}$) in the range from 2.5:1 to 10:1.

6. The process of claim 1, wherein the calcium phosphate of step b) is dicalcium phosphate dihydrate and is provided in an amount from 1.7 to 230 wt.-%, based on the total weight of the calcium salt excluding monocalcium phosphate and dicalcium phosphate.

7. The process of claim 1, wherein the calcium phosphate of step b) is anhydrous dicalcium phosphate and is provided in an amount from 1.4 to 181 wt.-%, based on the total weight of the calcium salt excluding monocalcium phosphate and dicalcium phosphate.

8. The process of claim 1, wherein the aqueous suspension formed in step c) has a solids content from 1 to 90 wt.-%, based on the total weight of the aqueous suspension.

9. The process of claim 1, wherein step d) is carried out at a pH value from 4.5 to 14.

10. The process of claim 1, wherein the dicalcium phosphate of step b) is produced by the following steps:
    i) providing the calcium ion source excluding dicalcium phosphate,
    ii) providing the phosphate ion source selected from phosphoric acid, a salt thereof, or a mixture thereof, and
    iii) contacting the calcium ion source of step i) and the phosphate ion source of step ii) in the presence of water to form dicalcium phosphate,
    wherein the calcium ion source of step i) and the phosphate ion source of step ii) in combination are provided in a calcium ion to phosphate ion molar ratio from 1:2 to 5:1.

11. The process of claim 10, wherein the calcium ion source of step i) is the same as the calcium salt of step a) of claim 1 and/or the phosphate ion source of step ii) is phosphoric acid.

12. The process of claim 10, wherein the phosphate ion source is phosphoric acid, a hydrogen-free salt of phosphoric acid, a monohydrogen salt of phosphoric acid, Na$_2$HPO$_4$, or a dihydrogen salt of phosphoric acid, or a mixture thereof.

* * * * *